United States Patent [19]

Adachi

[11] Patent Number: 5,253,076
[45] Date of Patent: Oct. 12, 1993

[54] VIDEO SIGNAL RECORDING-REPRODUCTION DEVICE

[75] Inventor: Makoto Adachi, Nikko, Japan

[73] Assignee: Sharp Kabushiki Kaisha, Osaka, Japan

[21] Appl. No.: 638,566

[22] Filed: Jan. 4, 1991

[30] Foreign Application Priority Data

Apr. 6, 1990 [JP] Japan ................................ 2-92576

[51] Int. Cl.⁵ .............................................. H04N 5/95
[52] U.S. Cl. ........................... 358/339; 358/335; 358/310; 360/22
[58] Field of Search ............... 358/339, 335, 310, 320, 358/330, 337, 11, 12, 14; 360/9.1, 22, 29, 30, 33.1, 36.2

[56] References Cited

U.S. PATENT DOCUMENTS

| | | |
|---|---|---|
| 3,806,640 | 4/1974 | Furukawa . |
| 4,458,271 | 7/1984 | Horstmann ............................ 360/22 |
| 4,567,508 | 1/1986 | Hulyer ................................. 358/11 |
| 4,757,392 | 7/1988 | Awamoto et al. ..................... 360/22 |
| 4,780,769 | 10/1988 | Numakura et al. ................... 358/320 |
| 4,839,744 | 6/1989 | Sasaki et al. ......................... 358/320 |
| 4,873,582 | 10/1989 | Furuhata et al. .................... 358/335 |
| 4,963,991 | 10/1990 | Honjo ................................. 358/335 |

FOREIGN PATENT DOCUMENTS

| | | |
|---|---|---|
| 0171759 | 2/1986 | European Pat. Off. . |
| 0226796 | 7/1987 | European Pat. Off. . |
| 57-097281 | 6/1982 | Japan . |
| 58-147847 | 9/1983 | Japan . |
| 61-071782 | 4/1986 | Japan . |
| 62-060393 | 3/1987 | Japan . |

*Primary Examiner*—Tommy Chin
*Assistant Examiner*—Thai Tran

[57] ABSTRACT

A video signal recording-reproduction device is provided with a recording device for applying time base extension of N-times to an input video signal to form a recording signal and recording the signal on a recording medium by dividing it into a plurality of channels the number of which is given by N or integral multiples of N. The recording device includes a line memory control circuit for shifting a phase of a signal such that the phase shift between adjacent channels is a 1/N horizontal scanning period. The video signal recording-reproduction device is also provided with a reproduction device for forming an output video signal by reproducing a recording signal from each channel and by making a separated sync signal of the recording signal of each channel to coincide with a horizontal synchronizing signal of the input video signal. More specifically, the reproduction device includes an OR circuit which conducts a logical OR operation upon the separated sync signals of the respective signals, each reproduced from each channel. Thereby, the separated sync signal obtained by the logical OR operation coincides with the horizontal synchronizing signal of the input video signal.

13 Claims, 22 Drawing Sheets

VIDEO SIGNAL RECORDING-REPRODUCTION DEVICE

FIELD OF THE INVENTION

The present invention relates to a video signal recording-reproduction device for recording and reproducing a video signal with wideband for use in, for example, HDTV (High Definition Television) VTRs (Video Tape Recorders) and the like.

BACKGROUND OF THE INVENTION

In the case of recording a video signal with wideband on a recording medium such as a magnetic tape, an input video signal (FIG. 23 a) is sometimes arranged to undergo double time base extension by the use of time base conversion means, and are divided into two channels to be recorded or reproduced. In conventional video signal recording-reproduction devices, every odd numbered 1H (horizontal scanning period) of those divided video signals (FIG. 23a) is made to form a recording signal (FIG. 23b) for channel 1 (CH1) .while every even numbered IH is made to form a recording signal (FIG. 23c) for channel 2 (CH2), and thereby those two signals are recorded with the same phase. On the other hand, in reproduction, the divided record signals of two channels (FIGS. 23b,c) are converted into the same signal as the input video signal before being divided (FIG. 23a), by conducting time base compression.

However, the conventional video signal recordingreproduction devices present a problem that a complicated circuit configuration is needed for converting the divided recording signals of two channels (FIGS. 23b,c) into the input video signal (FIG. 23 a) before being divided in reproduction.

More specifically, when the divided recording signals (FIGS. 23b,c) undergo time base compression, sync separated signals (FIGS. 23 d,e) corresponding to a horizontal synchronizing signal of the input video signal (FIG. 23a) are used as reference signals. In this case, since these separated sync signals (FIGS. 23d,e) are formed by reproducing the recording signals (FIGS. 23b,c) recorded with the same phase, they also have the same phase. Accordingly, when the separated sync signals (FIGS. 23d,e) are used as reference signals, a frequency doubler is necessary in order to conform the phase to that of the horizontal synchronizing signal which the input video signal (FIG. 23a) possessed, thereby causing a complicated circuit configuration.

SUMMARY OF THE INVENTION

It is an object of the present invention to provide a video signal recording-reproduction device which includes a simplified circuit for converting divided recording signals into the same signal as the input video signal before being divided.

In order to achieve the above object, a video signal recording-reproduction device according to the present invention comprises a recording system wherein an input video signal is subject to time base extension of N-times to form a recording signal, and the recording signal is divided into channels the number of which is given by N or integral multiples of N to be recorded on a magnetic tape as a recording medium and a reproduction system wherein the recording signals recorded in the recording medium are reproduced by each channel, and an output video signal is formed by conforming separated sync signals of the respective divided recording signals to a horizontal synchronizing signal of the input video signal. The recording system includes phase changing means for shifting a phase of the recording signal of each channel by a 1/N horizontal scanning period, while the reproduction system includes phase restoration means for conducting logical OR of the separated sync signals of the record signals, each reproduced by each channel.

With the above arrangement, the phase changing means of the recording system enables the phase of the recording signal of each channel, recorded in the recording medium to shift by a 1/N horizontal scanning period Accordingly, in reproduction, each recording signal is reproduced with the phase of its separated sync signal shifted by a 1/N horizontal scanning period. Then, the phase restoration means conducts logical OR of these separated sync signals. As a result, a sync separated signal obtained by conducting the logical OR coincides with the horizontal synchronizing signals of the input video signal. Thus, the video signal recording-reproduction device permits conformity between a separated sync signal derived from recording signals and a horizontal synchronizing signal of an input video signal, which is needed for converting divided recording signals into an output video signal, solely by using the phase restoration means. Therefore, for example, no frequency doubler is necessary, and a simplified circuit configuration can be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a timing chart showing conditions of signals in a video signal recording-reproduction device.

FIG. 2 is a block diagram showing a configuration of the video signal recording-reproduction device.

FIG. 3 is a circuit diagram showing one portion of a line memory control circuit of a recording system.

FIG. 4 is a timing chart showing conditions of signals in the circuit shown in FIG. 3.

FIG. 5 is a timing chart showing conditions of signals in the recording system.

FIG. 6 is a block diagram showing the line memory control circuit.

FIG. 7 is a circuit diagram of a field discrimination circuit.

FIG. 8 is a timing chart showing conditions of signals in the field discrimination circuit.

FIG. 9 is a timing chart showing conditions of signals in a frame clear pulse generation circuit and a selector pulse generation circuit.

FIG. 10 is a circuit diagram of the frame clear pulse generation circuit and selector pulse generation circuit.

FIG. 11 is a timing chart showing conditions of signals in the first and second line memory control circuits.

FIG. 12 is a circuit diagram of the first and second line memory control circuits.

FIG. 13 is a circuit diagram of a PLL circuit.

FIG. 14 is a circuit diagram showing mutual connections of an A/D converter, line memories and D/A converters in the recording system.

FIG. 15 is a block diagram showing a configuration of a line memory control circuit of reproduction system.

FIG. 16 is a timing chart showing conditions of signals of the reproduction system.

FIG. 17 is a circuit diagram showing mutual connections of a VD generation circuit, phase restoration means and a field discrimination circuit.

FIG. 18 is a timing chart showing conditions of signals in the line memory control circuit of the reproduction system.

FIG. 19 is a circuit diagram showing one portion of the line memory control circuit of the reproduction system.

FIG. 20 is a circuit diagram showing one portion of the line memory control circuit of the reproduction system.

FIG. 21 is a circuit diagram showing mutual connections of A/D converters, line memories and a D/A converter in the reproduction system.

FIG. 22 is a block diagram showing another example of configuration of a video signal recording-reproduction device.

DESCRIPTION OF THE EMBODIMENTS

The following description will discuss one embodiment of the present invention referring to FIGS. 1 to 22.

Figure 2:
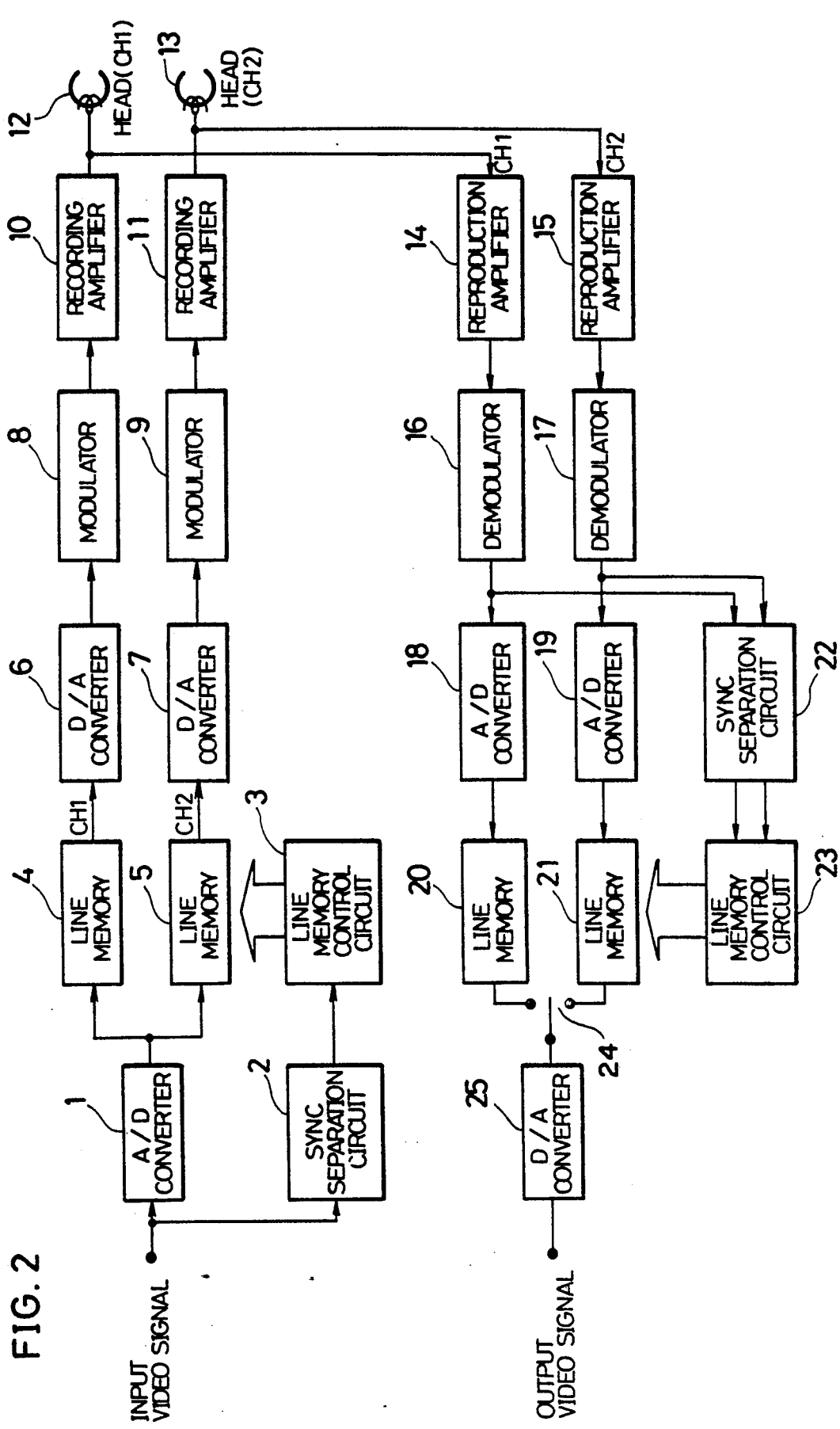

The disclosure of the present invention is made with respect to a video signal recording-reproduction device which performs recording, and reproduces the recordings, for example, by the use of rotary head in the helical recording method. As shown in FIG. 2, the video signal recording-reproduction device includes a recording system for recording on a magnetic tape (recording medium) an input video signal as a recording signal and a reproduction system for reproducing a recording signal recorded on the magnetic tape as a reproduction video signal.

The recording system comprises an A/D converter 1 for converting an input video signal as an analog signal into a digital signal and a sync separation circuit 2 for forming a separated sync corresponding to a horizontal synchronizing signal portion of the input video signal. The sync separation circuit 2 is connected to a line memory control circuit 3 as a phase changing means. The line memory control circuit 3 releases various reset pulses and clocks to respective line memories 4, 5 according to the separated sync signal from the sync separation circuit 2.

Figure 3:
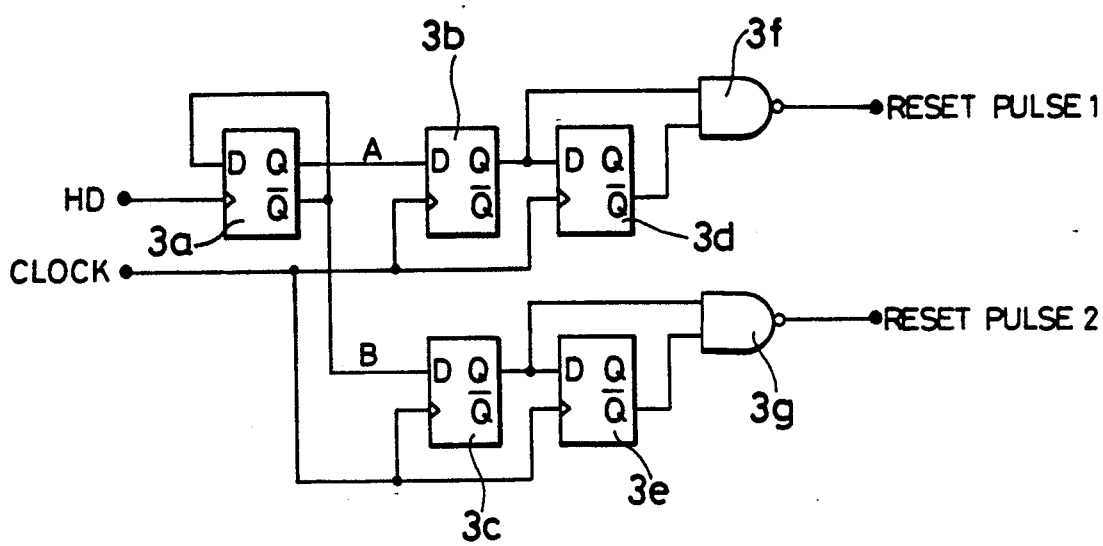
Figure 4:
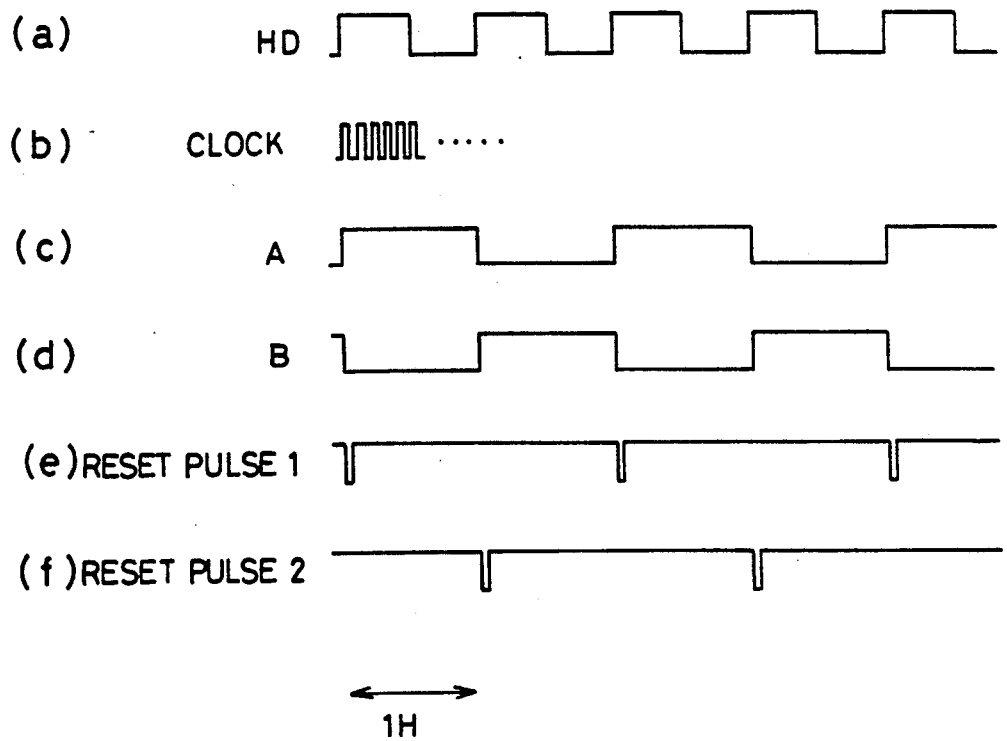

In other words, the line memory control circuit 3 comprises, for example, FF (Flip-Flop) circuits 3a, 3b, 3c, 3d, 3e and NAND circuits 3f, 3g, as shown in FIG. 3, and is arranged to release a reset pulse 1 (FIG. 4e) and a reset pulse 2 (FIG. 4f) based on an HD signal (FIG. 4a) whose one cycle coincides with one horizontal scanning period (hereinafter referred to as H) and on a clock (FIG. 4b). The reset pulses 1, 2 are entered to the line memories 4, 5 respectively.

As shown in FIG. 2, the above-mentioned A/D converter 1 is connected to the line memories 4, 5, and thereby an input video signal converted into a digital signal is entered thereto from the A/D converter 1. Then, the line memories 4, 5 conduct time base extension on the input video signal and separate it into two channels according to the reset pulses and clocks from the line memory control circuit 3, thereby releasing divided signals with a phase shift of ½H to each other.

The signals derived from the input video signal, separated into two channels by the line memories 4, 5, are converted into recording signals in two lines of the signal recording systems. The signal recording system includes the line memories 4, 5, D/A converters 6, 7 for converting a digital signal into an analog signal, modulators 8, 9 and recording amplifiers 10, 11 for predetermined voltage amplification. Thus, the recording signals formed in the signal recording systems are recorded on a magnetic tape (not shown) in two channels with a phase shift of ½H to each other through heads 12, 13.

On the other hand, as with the recording system, the reproduction system is connected to the heads 12, 13, and the recording signals with a phase shift of ½H to each other are reproduced through the heads 12, 13. The heads 12, 13 are connected to respective reproduction amplifiers 14, 15 for amplifying the reproduced signals, and the reproduction amplifiers 14, 15 are connected to respective demodulators 16, 17 for converting frequency into voltage.

The demodulators 16, 17 are on the one hand connected to A/D converters 18, 19 for converting analog signal into digital signal, and on the other hand, connected to a sync separation circuit 22 for extracting separated sync signals, each forming a horizontal synchronizing signal portion, from respective record signals. Further, the sync separation circuit 22 is connected to a line memory control circuit 23 including a phase restoration means for conducting logical OR of separated sync signals. With the arrangement, the line memory control circuit 23 can generate a horizontal synchronizing signal with a frequency identical to that of the input video signal.

The line memory control circuit 23 is connected to line memories 20, 21 to which are connected the respective A/D converters 18, 19, whereby the recording signals converted into digital signals are inputted to the line memories 20, 21 Thus, the line memories 20, 21 conduct time compression of the recording signals inputted thereto, based on signals released from the line memory control circuit 23. As described above, the reproduction amplifiers 14, 15, demodulators 16, 17, A/D converters 18, 19 and line memories 20, 21 pertain to the signal reproduction system.

The line memories 20, 21 are connected to a D/A converter 25 through a switch 24. The switch 24 on the one hand permits continuity of the line memory 20 and D/A converter 25 with every odd numbered H, and on the other hand, permits continuity of the line memory 21 and D/A converter 25 with every even numbered H. The D/A converter 25 releases an output video signal by converting outputs from the line memories 20, 21 into analog signals.

The following description will discuss operation of a video signal recording-reproduction device having the above configuration.

An input video signal (FIG. 1a) is entered to the A/D converter 1 to be converted into a digital signal, and at the same time entered to the sync separation circuit 2, which conducts sync separation on the input video signal. A separated sync signal obtained by the sync separation makes a reference signal for time base extension, and is entered to the line memory control circuit 3. The line memory control circuit 3 generates various signals for controlling the line memories based on the separated sync signal.

Moreover, the input video signal which has been converted into a digital signal in the A/D converter 1, is entered to the line memory 4, 5, where the signal is divided into two channels and subject to time base extension, thereby forming record signals (FIGS. 1 b,c) with a phase shift of ½H to each other.

An output of the line memory 4 forming the CH1 is inputted to the D/A converter 6 to be converted into an analog signal, while an output of the line memory 5 forming the CH2 is inputted to the D/A converter 7 to be converted into an analog signal. For recording signals (FIGS. 1 b,c) are inputted to the respective modulators 8, 9 where they are frequency modulated, and then amplified by the recording amplifiers 10, 11, thereby being recorded on a magnetic tape in two channels through the magnetic heads 12,13.

On the other hand, the recording signals (FM modulated signals of FIGS. 1 b,c) recorded on the magnetic tape, after having been reproduced through the heads. 12, 13 with a phase shift of ½H to each other, are inputted to the reproduction amplifiers 14, 15. The recording signals (FM modulated signals of FIGS. 1b,c) amplified by the reproduction amplifiers 14, 15, after having been demodulated in the demodulators 16, 17, are converted into digital signals in the A/D converters 18, 19. The recording signals converted into digital signals (digital signals of FIGS. 1b,c) are inputted to the line memories 20, 21 respectively.

At this time, by the sync separation circuit 22, a separated sync signal (FIG. 1d) of the CHI and a separated sync signal (FIG. 1e) of the CH2 are extracted from the respective record signals (FIGS. 1b,c) demodulated in the demodulators 16, 17. These separated sync signals (FIGS. 1d,e) are inputted to the line memory control circuit 23. Thus, logical OR is carried out on the separated sync signals (FIGS. 1d,e) with a phase shift of ½H to each other, and a separated sync signal (FIGS. 1f) identical to that of the input video signal (FIG. 1a) is formed.

Figure 1:
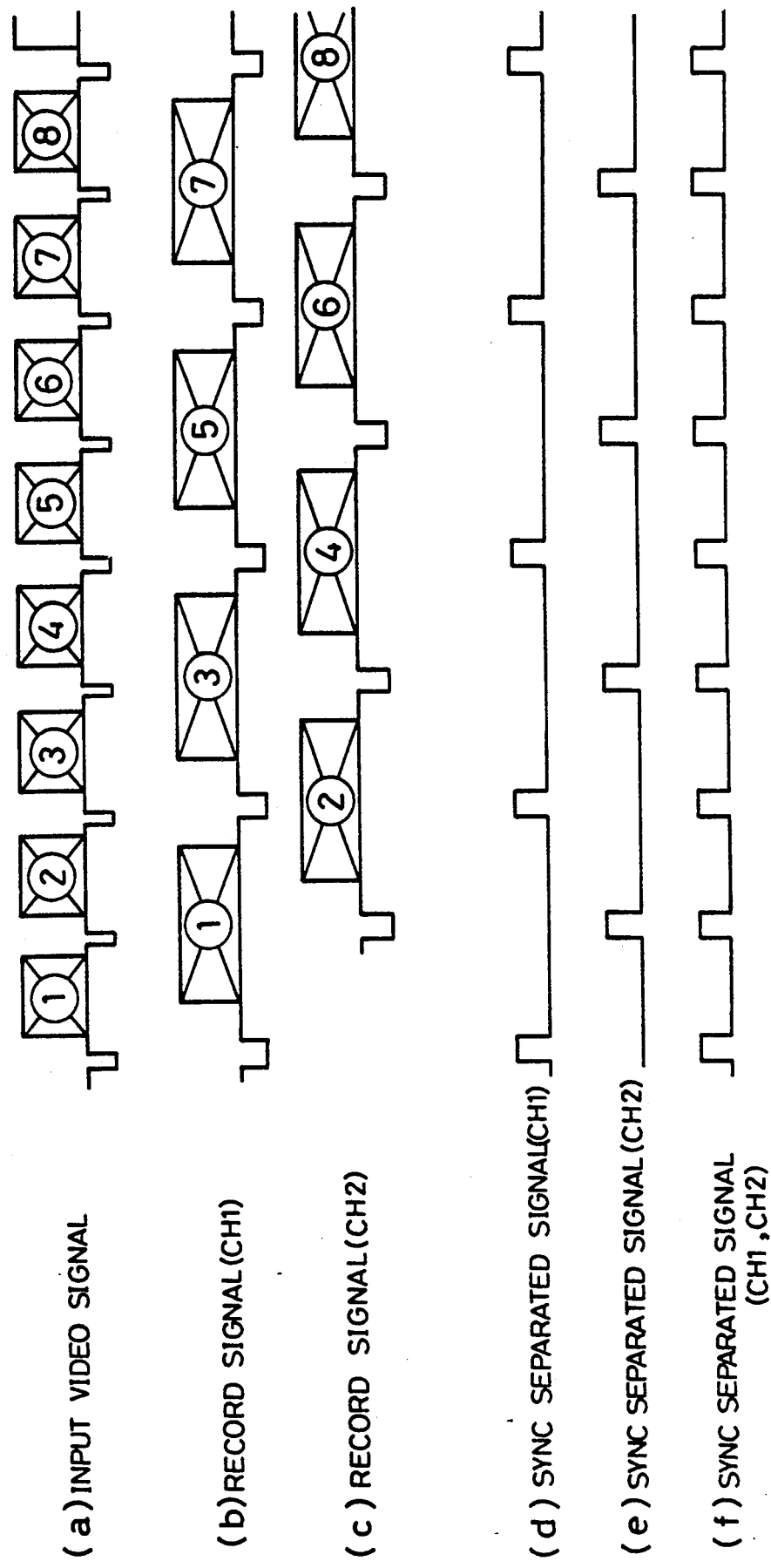
FIGS. 1 to 22 show one embodiment of the present invention.

The separated sync signal (FIG. 1f) is inputted to line memories 20, 21 as a reference signal for time compression. The line memories 20, 21 conduct time compression of the recording signals (FIGS. 1b,c) according to the separated sync signal (FIG. 1 f). In other words, the recording signals are subject to time compression while the switch 24 is changing its selection so that the line memory 20 is selected with every odd numbered H, and the line memory 21 is selected with every even numbered H. By inputting to the D/A converter 25 the recording signals having been subject to time compression, it is possible to obtain an output video signal identical to the input video signal (FIG. 1a).

As explained above, the video signal recordingreproduction device is arranged such that, in recording an input video signal (FIG. 1a) on a magnetic tape, it can. record a recording signal (FIG. 1b) of CH1 and a recording signal (FIG. 1c) of CH2, with a phase shift of ½H to each other while, in reproduction, it can obtain a separated sync signal (FIG. 1f) having an identical phase to that of the input video signal (FIG. 1a) by conducting logical OR of separated sync signals (FIGS. 1d,e) obtained from the record signals (FIGS. 1b,c).

With the arrangement, the video signal recordingreproduction device having the separated sync signal (FIG. 1f) as a reference signal, requires no frequency doubler. or the like for permitting conformity to the phase of the input video signal (FIG. 1a), and thereby it is possible to simplify the circuit for reproducing the divided record signals (FIGS. 1b,c) to form the input video signal (FIG. 1a) before having been divided.

Additionally, in the present embodiment, an example is shown wherein a recording signal is subject to double time base extension, and recording and reproduction are performed by the use of two channels; yet the present invention is not limited to the above arrangement. Therefore, the record signal may be subject to time base extension of N-times (for example, triple or quadruple), and may be divided into channels the number of which is given by N or integral multiples of N (for example, three channels or four channels) to be recorded or reproduced. In this case, a recording signal for each channel may be recorded with a phase shift of 1/N horizontal scanning period (H) to one another, and in reproduction, by conducting logical OR of separated sync signals of those channels, it is possible to simplify the circuit.

Next, a detailed explanation will be given of the above-mentioned recording system and reproduction system.

Figure 5:
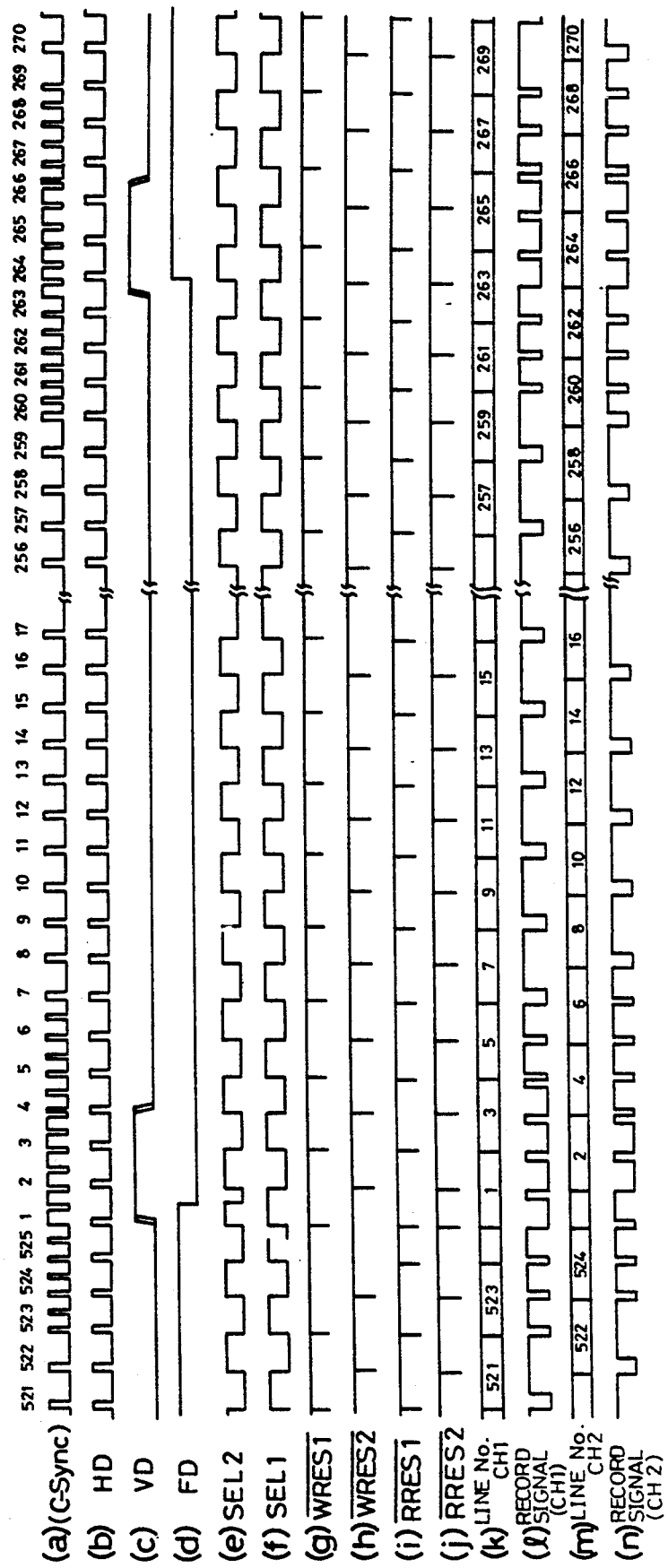
Figure 6:
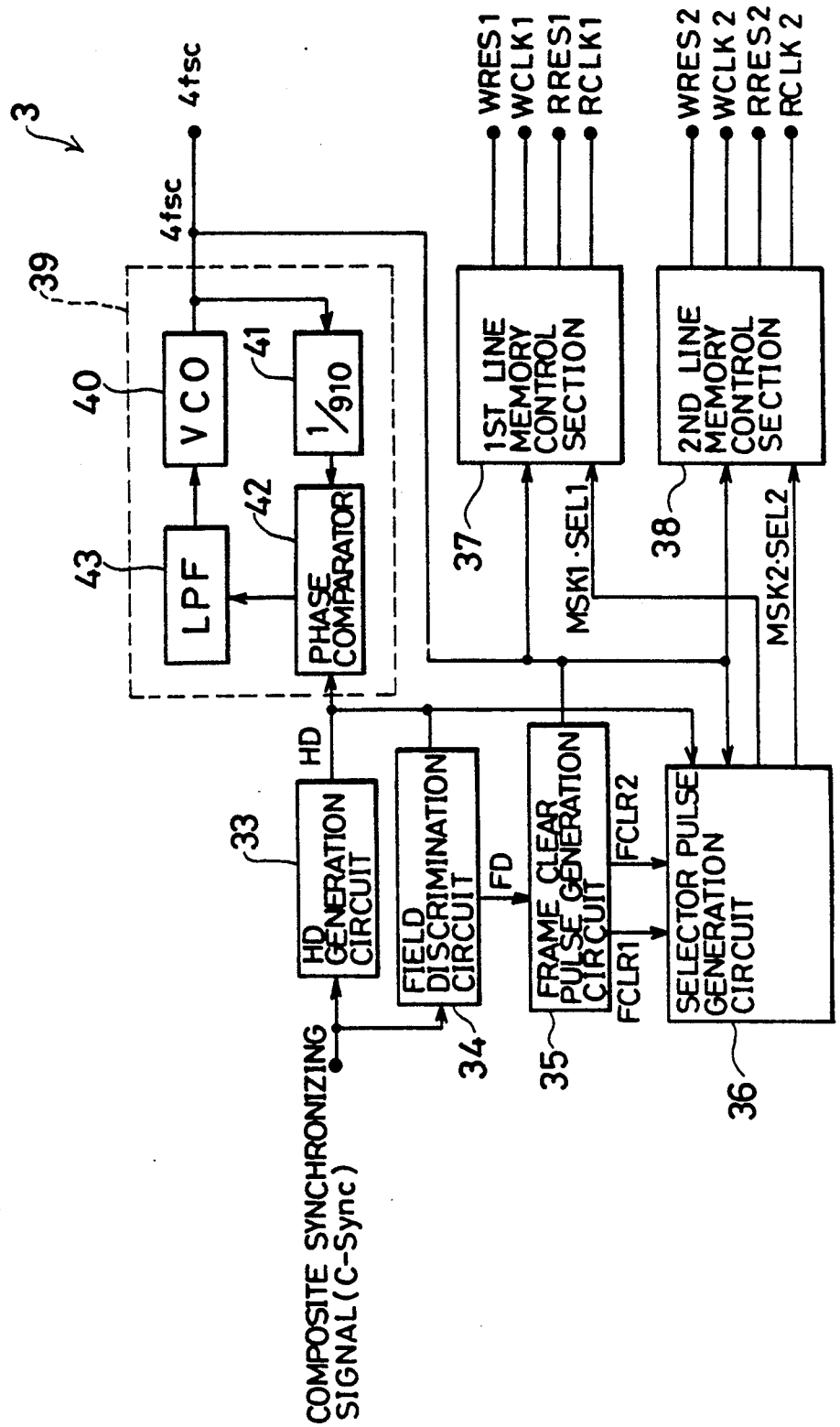

The line memory control circuit 3 to which a composite synchronizing signal (FIG. 5a) is entered from the separation sync circuit 2 of FIG. 2, comprises an HD generation circuit 33 for releasing the HD signal (horizontal synchronizing signal) (FIG. 5b) based on the composite synchronizing signal (FIG. 5a), as is shown in FIG. 6. An output of the HD generation circuit 33 is connected to a PLL circuit 39 for forming an fsc signal as a reference clock, to a field discrimination circuit 34 to which the composite synchronizing signal (FIG. 5a) is inputted as in the case of the HD generation circuit 33, and to a selector pulse generation circuit 36.

The field discrimination circuit 34 conducts vertical sync separation and field discrimination from the composite synchronizing signal (FIG. 5a), and an FD (Field Discrimination) signal (FIG. 5d) released from the field discrimination circuit 34 is entered to a frame clear pulse generation circuit 35. The frame clear pulse generation circuit 35 forms an FCLRI signal and an FCLR2 signal, which will be described later, each having a different phase to each other and released therefrom only once every one frame, and releases those signals to the selector pulse generation circuit 36.

The selector pulse generation circuit 36 is arranged to form an SEL1 signal (FIG. 5f) for selecting every odd numbered H and an SEL2 signal (FIG. 5e) for selecting every even numbered H, and the SELI signal (FIG. 5f) is released to a first line memory control section 37 of the channel side, while the SEL2 signal (FIG. 5e) is released to a second line memory control section 38 of the channel 2 side.

The first line memory control section 37 is arranged such that it can release to the line memory 4 of FIG. 2, a WRESI signal (FIG. 5g) indicating a start point for writing, a WCLKl signal as a clock for writing, an RRES1 signal (FIG. 5i) indicating a start point for reading, and an RCLKI signal as a clock for reading. On the other hand, the second line memory control section 38 is arranged such that it can release to the line memory 5 of FIG. 2, a WRES2 signal (FIG. 5h) indicating a start point for writing, a WCLK2 signal as a clock for writing, an RRES2 signal (FIG. 5j) indicating a start point for reading, and an RCLK2 signal as a clock for reading.

A detailed explanation will be given of each of the circuits composing the line memory control circuit 3.

Figure 7:
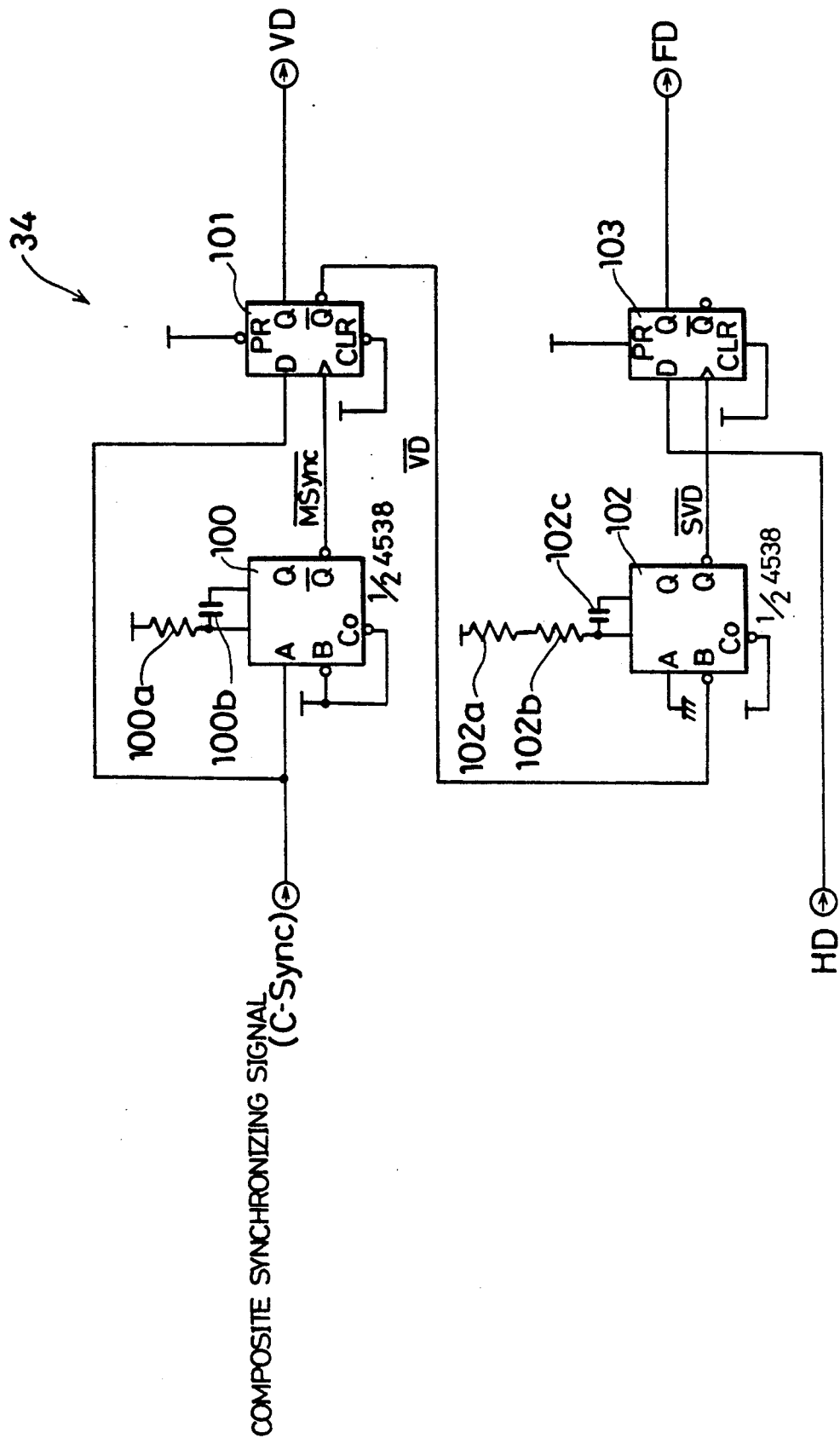
Figure 8:
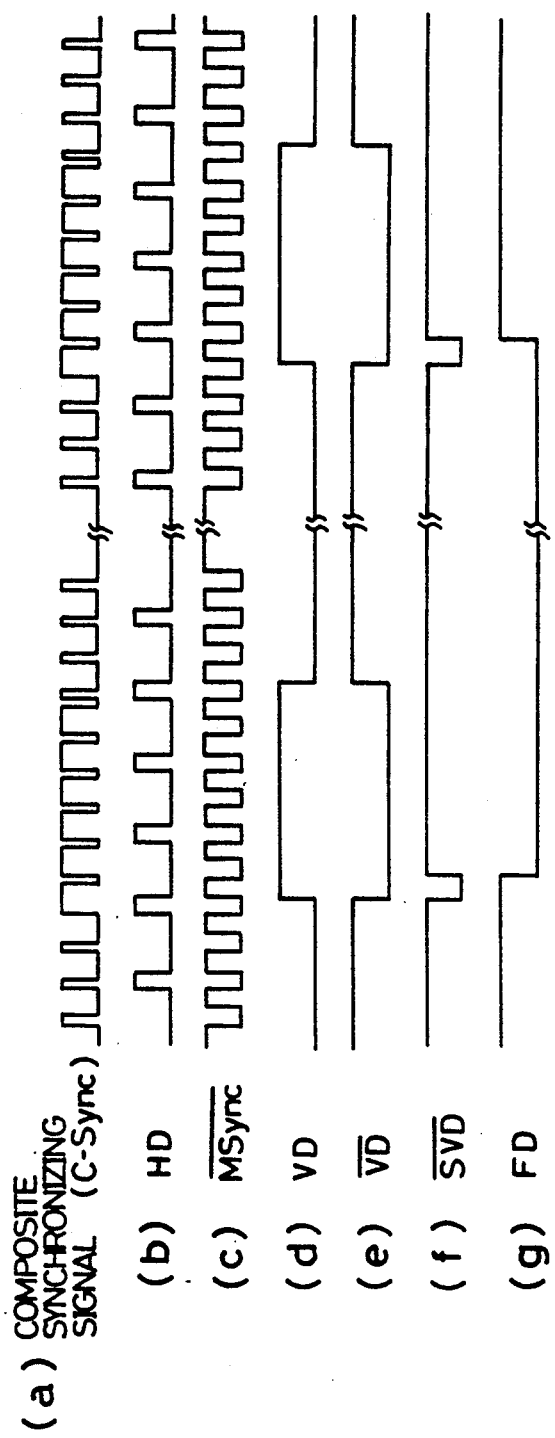
Figure 9:
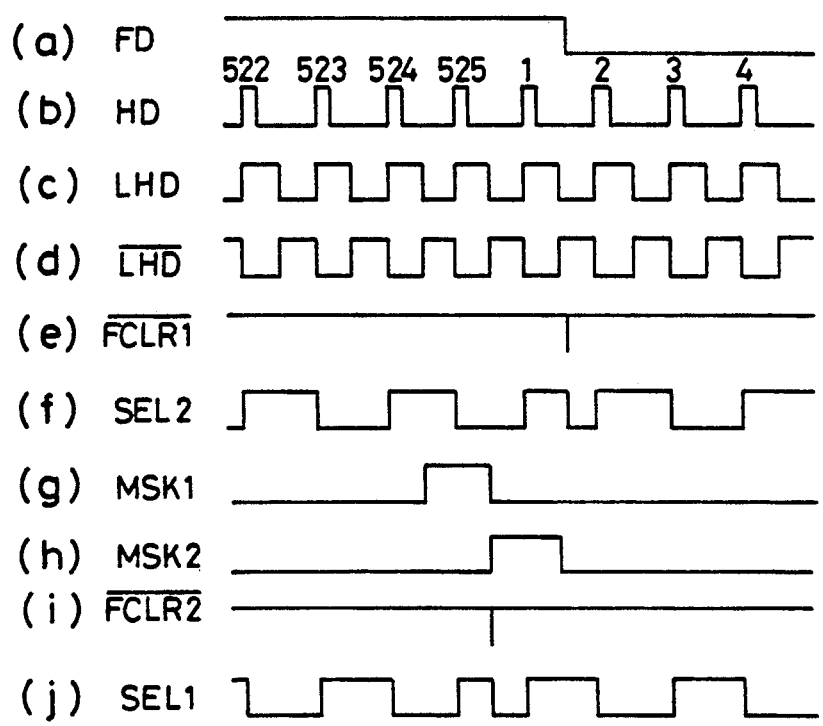

The field discrimination circuit 34 for discriminating between odd numbered fields and even numbered fields comprises, for example, monostable multivibrators 100, 102 of 4538 or the like and FF (Flip-Flop) circuits 101, 103 of HC74 or the like, as is shown in FIG. 7. A composite synchronizing signal (FIG. 8 a) is inputted to the monostable multivibrator 100 through an A terminal (trigger input terminal) thereof. The monostable multivibrator 100 is provided with a resistor 100a of 100 kΩ and a capacitor 100b of 100 pF, and the resistor 100a and the capacitor 100b are thus arranged to set pulse width of an $\overline{MSync}$ signal (FIG. 8c) which is released upon receiving a falling edge of the composite synchronizing signal (FIG. 8a).

Furthermore, the composite synchronizing signal (FIG. 8a) is also to a D-terminal of the FF circuit 101 to which the MSync signal (FIG. 8c) is inputted through a clock terminal thereof.. The FF circuit 101, on one hand releases a VD signal (vertical synchronizing signal) (FIG. 8d) from a Q-terminal thereof, and on the other hand releases an inverted $\overline{VD}$ signal (FIG. 8e) from a Q-terminal thereof. The $\overline{Q}$-terminal of the FF circuit 101 is connected to a B-terminal (trigger input terminal) of the monostable multivibrator 102, which is provided with a variable resistor 102a of 68 kΩ, a resistor 102b of 150 kΩ and a capacitor 102c of 100 pF. Those variable resistor 102a, resistor 102b and capacitor 102c are arranged to set pulse width of an $\overline{SVD}$ signal (FIG. 8f) which is released from the $\overline{Q}$-terminal upon receiving a falling edge of the $\overline{VD}$ signal (FIG. 8e).

The $\overline{Q}$-terminal of the monostable multivibrator 102 is connected to a clock terminal of the FF circuit 103, and the HD signal (FIG. 8b) is inputted to a D-terminal of the FF circuit 103. With the arrangement, the FF circuit 103 releases an FD signal (FIG. 8 g) from a Q-terminal thereof, which signal is set low with every odd numbered field, and set high with every even numbered field, based on the HD signal (FIG. 8 b) and the $\overline{SVD}$ signal (FIG. 8f).

An output of the above-mentioned field discrimination circuit 34 is connected to the frame clear pulse generation circuit 35, as is shown in FIG. 6, and the frame clear pulse generation circuit 35 is connected to the selector pulse generation circuit 36, and thereby arranged to release an $\overline{FCLR1}$ signal and an $\overline{FCLR2}$ signal.

Figure 10:
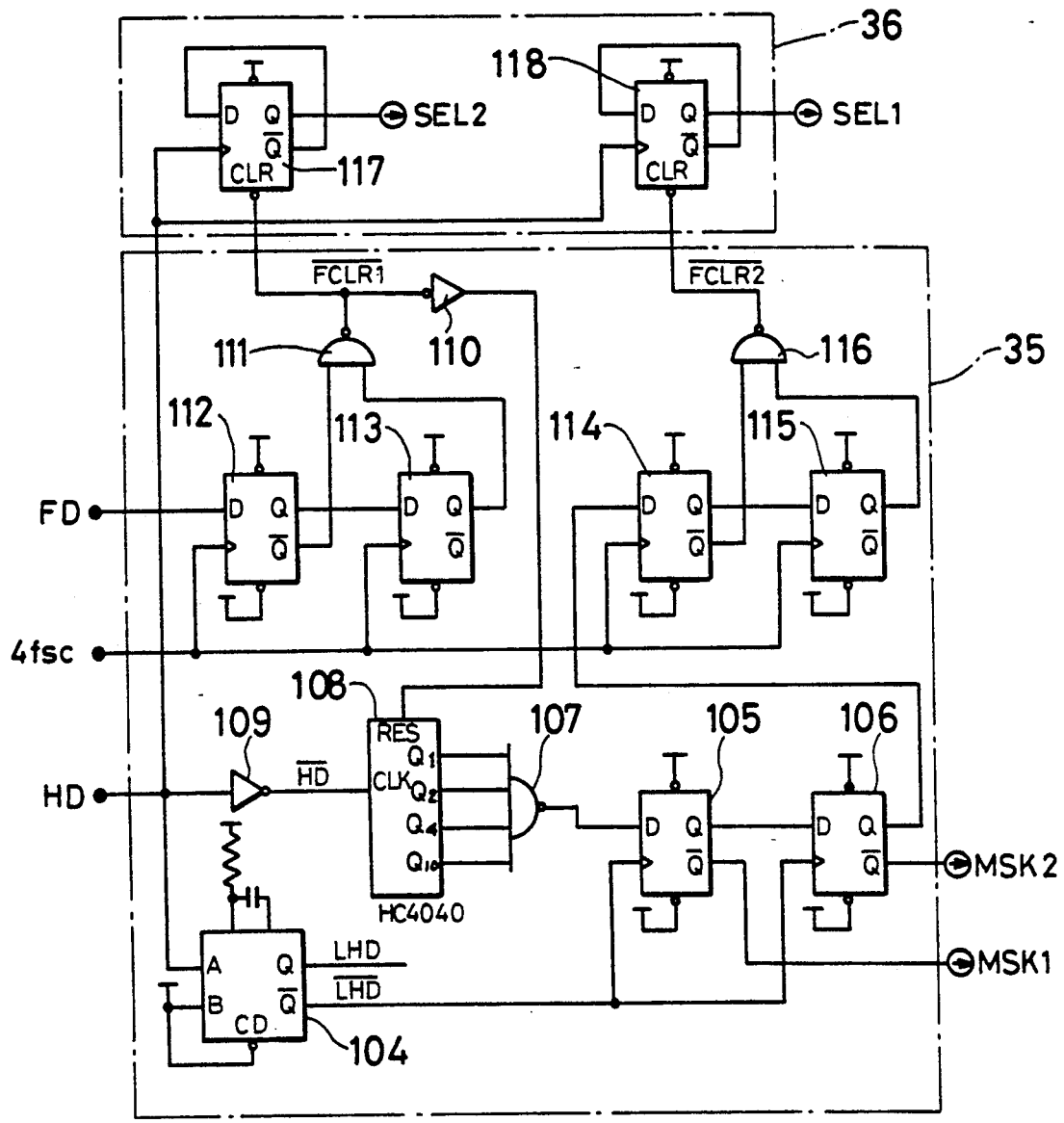

The frame clear pulse generation circuit 35 and selector pulse generation circuit 36 possess a circuit configuration shown in FIG. 10. The frame clear pulse generation circuit 35 includes a monostable multivibrator 104 to which the HD signal (FIG. 9b) is inputted, and the monostable multivibrator 104 releases a LHD signal (FIG. 9c) with its pulse width predeterminately set.

A $\overline{Q}$-terminal of the monostable multivibrator 104 is connected to respective clock terminals of FF circuits 105, 106, and a Q-terminal of the FF circuit 105 is connected to a D-terminal (data terminal) of the FF circuit 106. Further, an output terminal of a NAND circuit 107 with 4 inputs is connected to a D-terminal of the FF circuit 105, and to each of the inputs of the NAND circuit 107, are respectively connected a $Q_1$ terminal, $Q_2$ terminal, $Q_4$ terminal and $Q_{10}$ terminal (all are output terminals) of a counter circuit 108 of HC4040 or the like.

Moreover, an output terminal of a NOT circuit 109 is connected to a CLK terminal of the counter circuit 108, and the HD signal (FIG. 9b) is inputted to an input terminal of the NOT circuit 109. Furthermore, an output terminal of a NOT circuit 110 is connected to an RES terminal of the counter circuit 108, and to an input terminal of the NOT circuit 110, is connected an output terminal of a 2-input NAND circuit 111, which releases the $\overline{FCLR1}$ signal (FIG. 9e) which will be described later. With the arrangement, the FF circuits 105, 106 respectively release an MSKI signal (FIG. 9g) and an MSK2 signal (FIG. 9h) for resetting the respective WRES signals at their pulse indicating the number 525H.

To respective input terminals of the NAND circuit 111, are connected a $\overline{Q}$-terminal of an FF circuit 112 and a Q-terminal of an FF circuit 113. A Q-terminal of the FF circuit 112 is connected to a D-terminal of the FF circuit 113, and the FD signal (FIG. 9a) is inputted to a D-terminal of the FF circuit 112. Further, a 4 fsc signal is inputted to a respective clock terminals of the FF circuits 112, 113. Thus, the NAND circuit 111 can release the inverted $\overline{FCLR1}$ signal (FIG. 9e) having pulse width corresponding to one cycle of the 4fsc signal from a falling edge of the FD signal (FIG. 9a).

The 4fsc signal which is inputted to the clock terminals of the FF circuits 112, 113, is also fed to respective clock terminals of FF circuits 114, 115. The FF circuit 114 whose D-terminal is connected to a Q-terminal of the FF circuit 106, has its Q-terminal connected to a D-terminal of the FF circuit 115. The $\overline{Q}$-terminal of the FF circuit 114 is connected to one of input terminals of a 2-input NAND circuit 116, and a Q-terminal of the FF circuit 115 is connected to the other input terminal of the NAND circuit 116. With the arrangement, the NAND circuit 116 can release the inverted $\overline{FCLR2}$ signal (FIG. 9i) with phase lead of substantial 1H the $\overline{FCLR1}$ signal.

Each of the $\overline{FCLR1}$ signal (FIG. 9 e) and the $\overline{FCLR2}$ signal (FIG. 9i), which are released from the respective NAND circuits 111, 116 with inverted phase, is arranged to produce a pulse once every one frame, and thereby the $\overline{FCLR1}$ signal (FIG. 9e) produces a pulse at every number 1H forming a leading portion of a frame, while the $\overline{FCLR2}$ signal (FIG. 9i) produces a pulse at every number 525H forming a rear end portion of a frame.

The $\overline{FCLR1}$ signal (FIG. 9e) and the $\overline{FCLR2}$ signal (FIG. 9i) are released to the selector pulse generation circuit 36. The selector pulse generation circuit 36 includes an FF circuit 117 having a CLR terminal to which the $\overline{FLCR1}$ signal (FIG. 9e) is inputted and an FF circuit 18 having a CLR terminal to which the $\overline{FCLR2}$ signal (FIG. 9i) is inputted, and those FF circuits 117, 118 which are connected to each other through respective D-terminal and $\overline{Q}$-terminal, have the HD signal (FIG. 9b) inputted thereto through respective clock terminals. With the arrangement, the FF circuit 117 can release the SEL2 signal (FIG. 9f) for selecting every even numbered H while the FF circuit 118 can release the SELI signal (FIG. 9j) for selecting every odd numbered H.

The SELI signal (FIG. 9j) and the MSKI signal (FIG. 9g) from the FF circuit 105 are fed to the first line memory control section 37, as is shown in FIG. 6. On the other hand, the SEL2 signal (FIG. 9f) and the MSK2 signal (FIG. 9h) from the FF circuit 106 of FIG. 10 are fed to the second line memory control section 38. Those control sections 37, 38 have the same circuit configuration, and a detailed explanation is given of the circuit configuration referring to FIG. 12.

Figure 11:
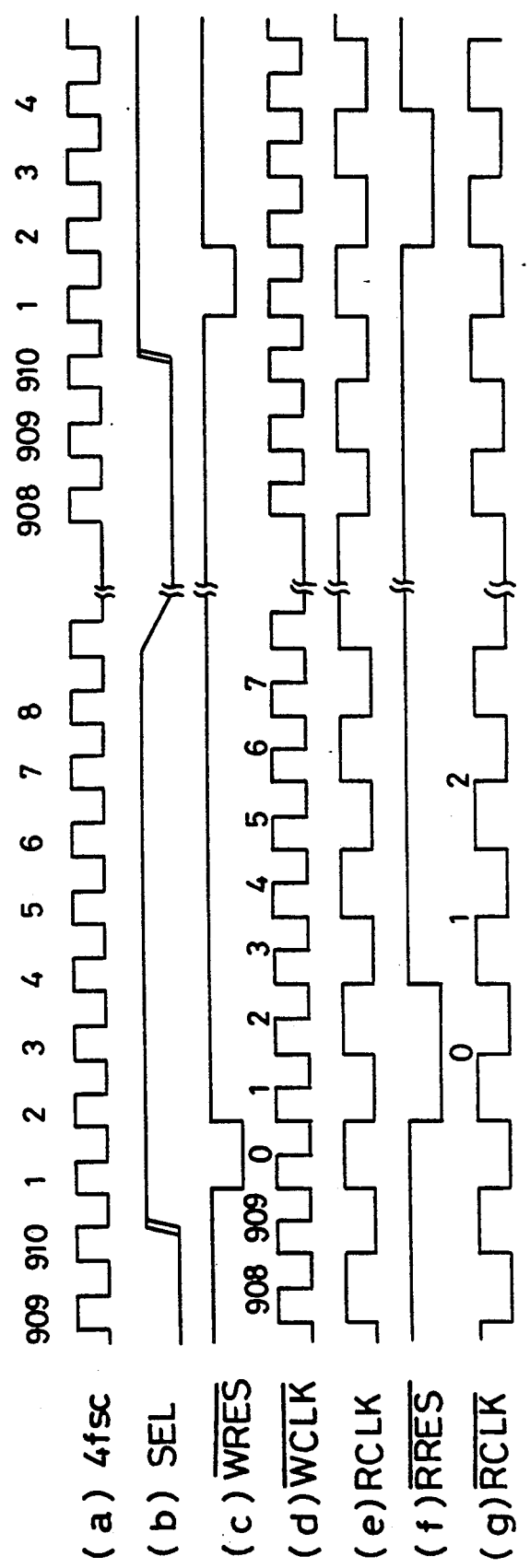
Figure 12:
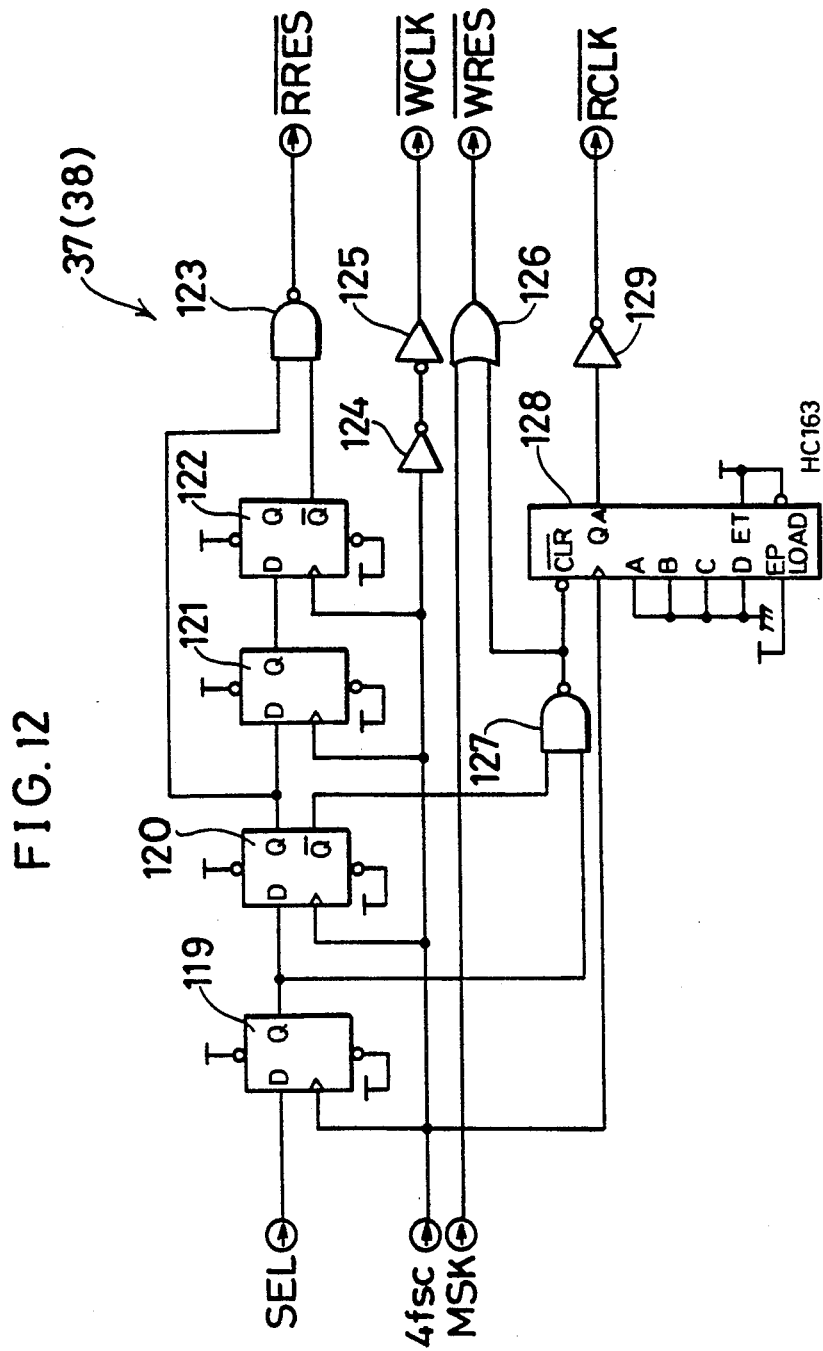

The first line control memory control section 37(38) has four stages of FF circuits 119 to 122, and the 4fsc signal FIG. 11 a) is inputted to each clock terminal of the FF circuits 119 to 122. Further, an SEL signal (FIG. 11b), actually the SEL1 (SEL2) signal in this case, is inputted to a u-terminal of the FF circuit 119 at the first stage, and a Q-terminal of the FF circuit 119 is connected to a D-terminal of the FF circuit 120 at the second stage. Moreover, a Q-terminal of the FF circuit 120 is connected to a D-terminal of the FF circuit 121 at the third stage, while a Q-terminal of the FF circuit 121 is connected to a D-terminal of the FF circuit 122 at the last stage.

A $\overline{Q}$-terminal of the FF circuit 122 is connected to one of input terminals of a 2-input NAND circuit 123, and a Q-terminal of the FF circuit 120 at the second stage is connected to the other input terminal of the NAND circuit 123. Thus, the NAND circuit 123 can release the inverted $\overline{RRES}$ signal (FIG. 11 f) having a pulse which appears immediately after one cycle of the 4fsc signal (FIG. 11 a) has expired since receipt of a rising edge of the SEL signal (FIG. 11b) and whose width corresponds to 2 cycles of the 4 fsc signal.

Moreover, each clock terminal of the FF circuits 119 to 122 is connected to two stages of NOT circuits 124, 125, and the NOT circuit 125 at the second stage releases the WCLK signal (FIG. 11d) having a slight phase delay to the 4fsc signal (FIG. 11a). Furthermore, a Q-terminal of the FF circuit 119 is connected to one of input terminals of a 2-input NAND circuit 127, and a $\overline{Q}$-terminal of the FF circuit 120 is connected to the other input terminal of the NAND circuit 127.

An output terminal of the NAND circuit 127 is connected to one input terminal an 2-input OR circuit 126, and to the other input terminal of the OR circuit 126 is inputted an MSK signal, actually the MSK1 signal (MSK2 signal) from the selector pulse generation circuit 36 of FIG. 6. With the arrangement, the OR circuit 126 releases the $\overline{WRES}$ signal (FIG. 11c) having a pulse whose width corresponds to 1 cycle of the 4fsc signal from a rising edge of the SEL signal (FIG. 11b).

The output terminal of the NAND circuit 127 is also connected to an asynchronous clear-type dividing circuit 128 of HC163 or the like. The above-mentioned 4 fsc signal (FIG. 11a) is inputted to a clock terminal of the asynchronous clear-type dividing circuit 128. The asynchronous clear-type dividing circuit 128 is thus arranged to release the inverted $\overline{RCLK}$ signal (FIG. 11g) having a frequency corresponding to ½ of that of the 4 fsc signal, through a NOT circuit 129. With the arrangement, it is possible to use the $\overline{WCLK}$ signal (FIG. 11d) having the same frequency as the 4 fsc signal in writing data and to conduct double time base extension of double in reading data by utilizing the $\overline{RCLK}$ signal (FIG. 11g) having a frequency corresponding to ½ of that of the 4 fsc signal.

Next, referring to FIG. 6, a detailed explanation will be given to the PLL circuit 39 for forming the 4 fsc signal to be inputted to the first and second line memory control sections 37, 38, the frame clear pulse generation circuit 35 and the selector pulse generation circuit 36.

Figure 13:
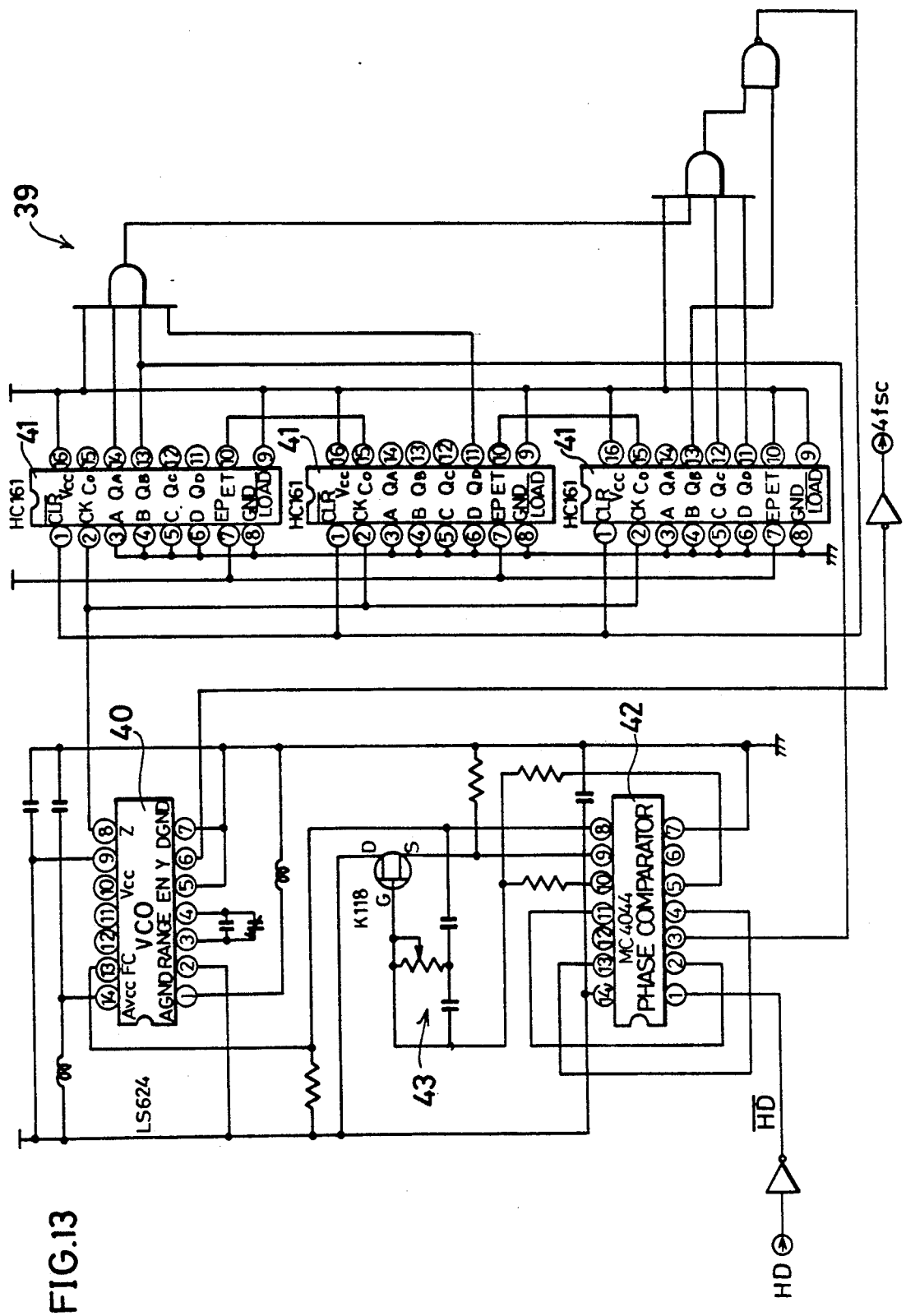

The FLL circuit 39 comprises a VCO (Voltage Control Oscillator) 40 of, for example, LS624 or the like, three 1/910 counters 41 each composed of, for example, HC161, a phase comparator 42 of, for example, MC4044 or the like and a LPF (Low Pass Filter) 43 composed of resistors and capacitors, as is shown in FIG. 13.

The VCO 40 is connected to each of the three 1/910 counters 41, and thereby permitted to release the 4 fsc signal. The 1/910 counters 41 to which the 4fsc signal is entered, release a signal whose frequency is divided into 1/910 of that of the 4fsc signal, and which is fed to the phase comparator 42. To the phase comparator 42, is connected the HD generation circuit 33 for releasing the HD signal to be compared with the signal from the 1/910 counters 41.

The phase comparator 42 compares the signal from the 1-/910 counters 41 with the HD signal and thereby releases a phase error signal, which is fed to the VCO 40 through the LPF 43. Thus, the VCO 40 is permitted to release the 4 fsc signal which has the same phase as the HD signal and forms a reference clock of 14.318 MHz which is 910 times that of the HD signal in the case of a signal in NTSC system, by being controlled in the LPF 43 so as to extract a dc component of the phase error signal and correct phase errors.

Next, referring to FIG. 2, a detailed explanation will be given of the line memories 4, 5 to which the signals from the line memory control circuit 3 including the first and second line memory control sections 37, 38 are inputted and of the A/D converter 1 and the D/A converters 6, 7 which are connected to those line memories 4, 5.

Figure 14:
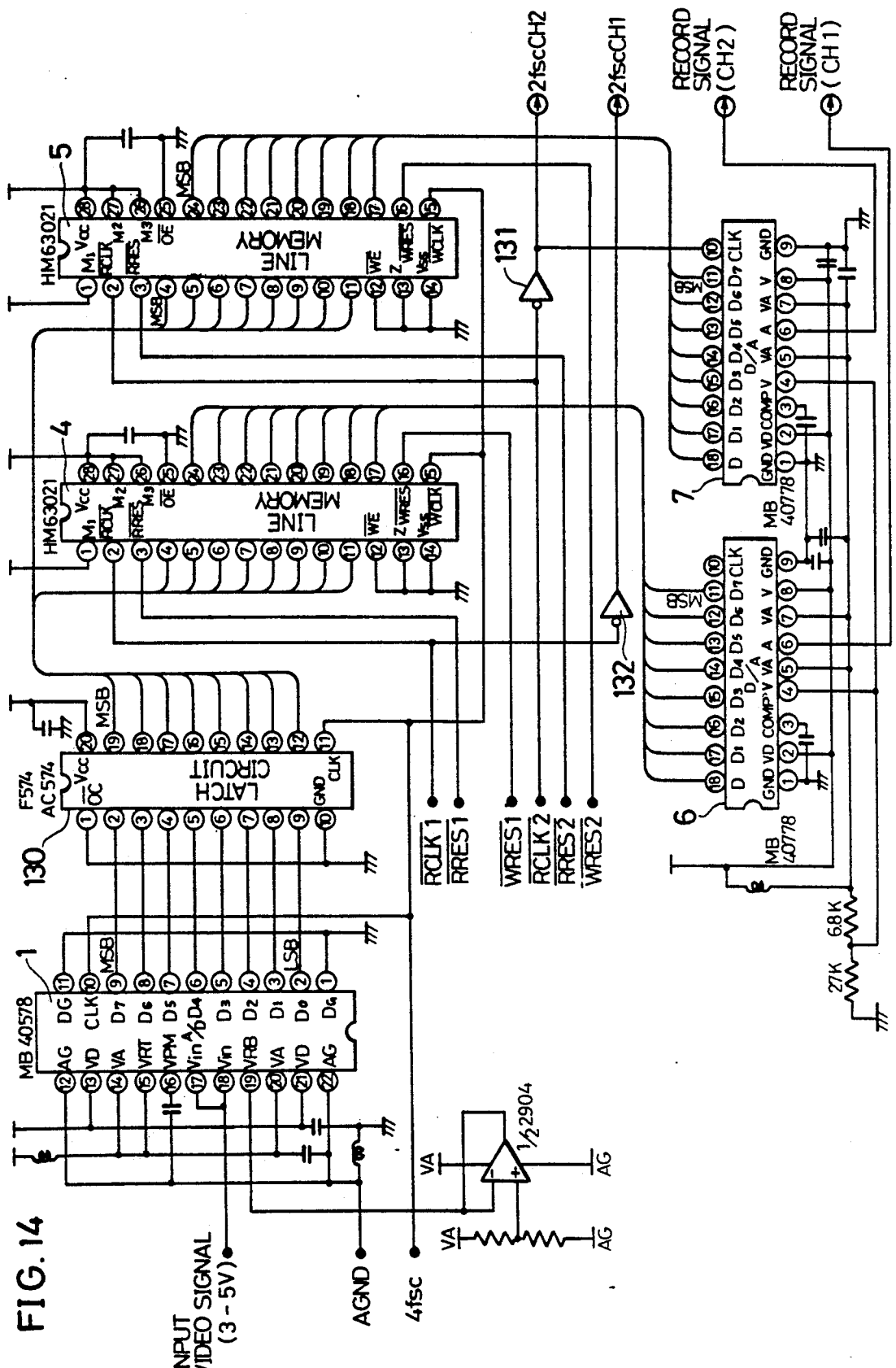

As shown in FIG. 14, the A/D converter which is made of, for example, MB40578 or the like, converts an input video signal of 3 V to 5 V inputted thereto through the $V_{in}$ terminal into a digital signal of 8 bits. The A/D converter 1 has terminals releasing the digital signal, connected to the line memories 4, 5 of, for example, HM63021 or the like through a latch circuit 130 of, for example, F574 or AC574.

To one of the line memories 4, are inputted the 4 fsc signal, $\overline{RCLK1}$ signal, RRES1 signal and $\overline{WRES1}$ signal, and the $\overline{RCLK1}$ signal is released through a NOT circuit 132 as a 2fscCH1 signal. Further, to the other line memory 5, are inputted the 4 fsc signal, $\overline{RCLK2}$ signal, signal and $\overline{WRES2}$ signal, and the $\overline{RCLK2}$ signal is released through a NOT circuit 131 as 2fscCH2 signal.

The line memories 4, 5 are respectively connected to the D/A converters 6, 7 of, for example, MB40778 or the like, and those D/A converters 6, 7 convert the digital signals from the line memories 4, 5 into analog signals, and thereby release those analog signals as record signals of CH1 and CH2.

Additionally, as shown in FIG. 5, in order to form those recording signals divided into respective two channels CH1 and CH2, it is necessary to divide data of the number 525H situated at the end into two of ½H so as to be apportioned to respective two channels. In that case, the data of the number 525H and data of the numbers 523H and 524H represent equalizing pulse portions of the video signal, i.e. they contain no information as picture images. Therefore, in the present embodiment, it is arranged that without storing the data of the number 525H in either line memory 4 or 5, the data of the number 523H are repeatedly read in their ½H portion for the CH1 side (see FIG. 5k) while the data of the number 524H are repeatedly read in their ½H portion for the CH2 side (see FIG. 5m).

Next, the following description will discuss the reproduction system in detail.

Figure 15:
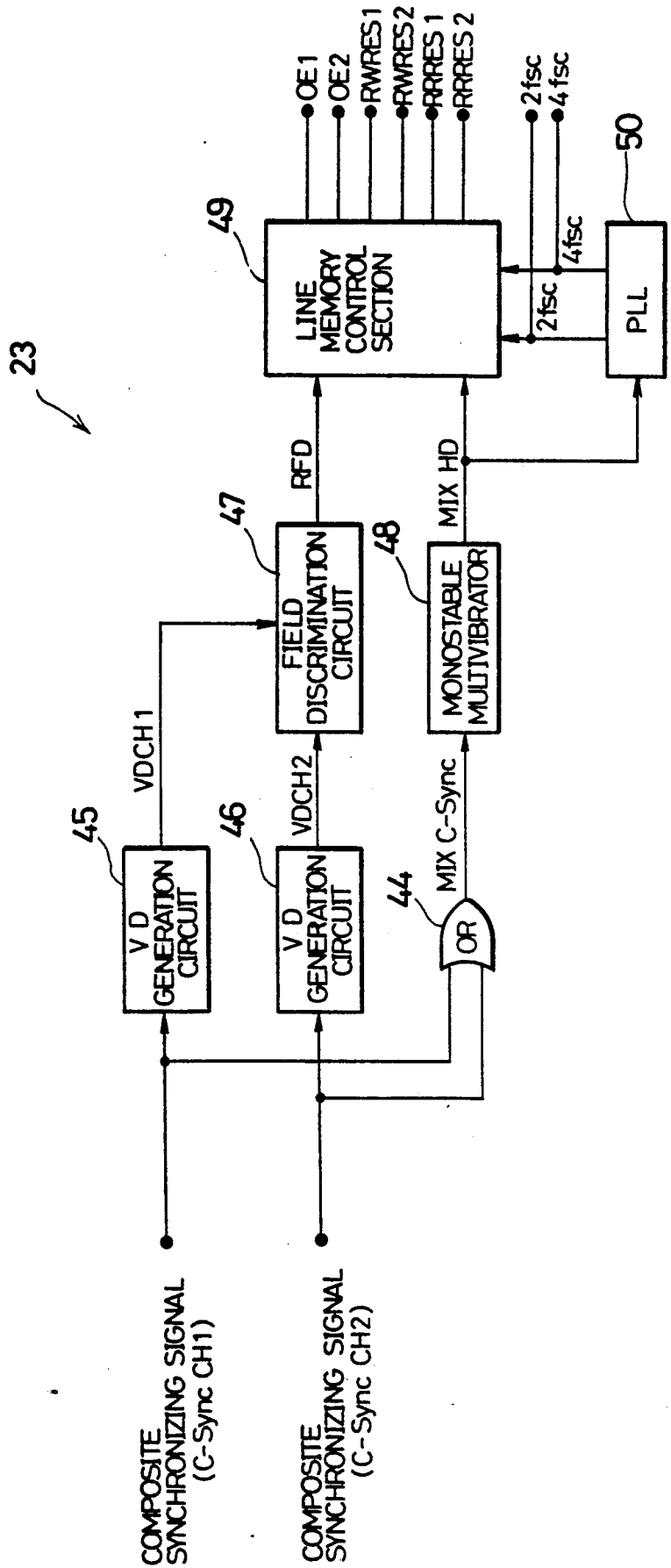
Figure 16:
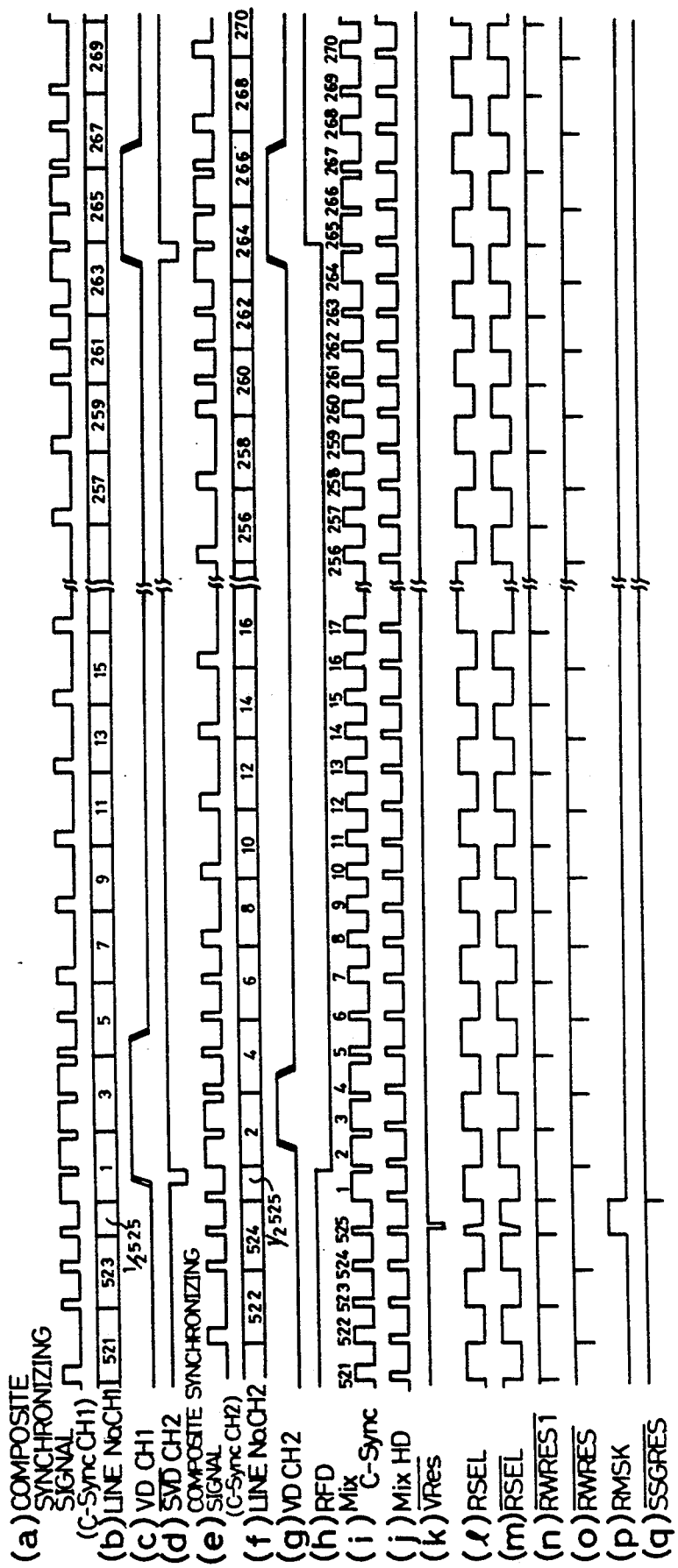

As shown in FIG. 15, the composite synchronizing signals (FIGS. 16a,e) of the CH1 and CH2 are inputted to the line memory control circuit 23 of the reproduction system from the sync separation circuit 22. Those composite synchronizing signals (FIGS. 16a,e) are inputted to an OR circuit 44 as phase restoration means of the line memory control circuit 23. The OR circuit 44 forms a Mix C-Sync signal (FIG. 16i) as a composite signal which is obtained by conducting logical OR of the composite synchronizing signals (FIGS. 16a,e) of the CH1 and CH2, and thereby releases the Mix C-Sync signal to a monostable multivibrator 48. The monostable multivibrator 48 forms a MIX HD signal (FIG. 16j) whose pulse width is made constant, and releases the MIX HD signal to a line memory control section 49 and a PLL circuit 50 for forming the 4 fsc signal and the 2fsc signal.

Further, the composite synchronizing signals (FIGS. 16a,e) of the CHI and CH2 are also inputted to VD generation circuits 45, 46. The VD generation circuits 45, 46 respectively form VD signals (FIGS. 16c,g) of the CH1 and CH2 so as to feed them to a field discrimination circuit 47. Thus, the field discrimination circuit 47 releases an RFD signal (FIG. 16h) obtained by conducting field discrimination, to the line memory control section 49.

The line memory control section 49 releases signals for controlling the line memories 20, 21 of FIG. 2, for example, an OEI signal and an OE2 signal which permit outputs of the line memories 20, 21 to become high impedance with their high level, and permit data from the line memories 20, 21 to be released with their low level, based on the RFD signal (FIG. 16h, MIX HD signal (FIG. 16j), 4 fsc signal and 2 fsc signal, each entered thereto.

Next, a detailed explanation is given of the circuit configuration of the line memory control circuit 23.

Figure 17:
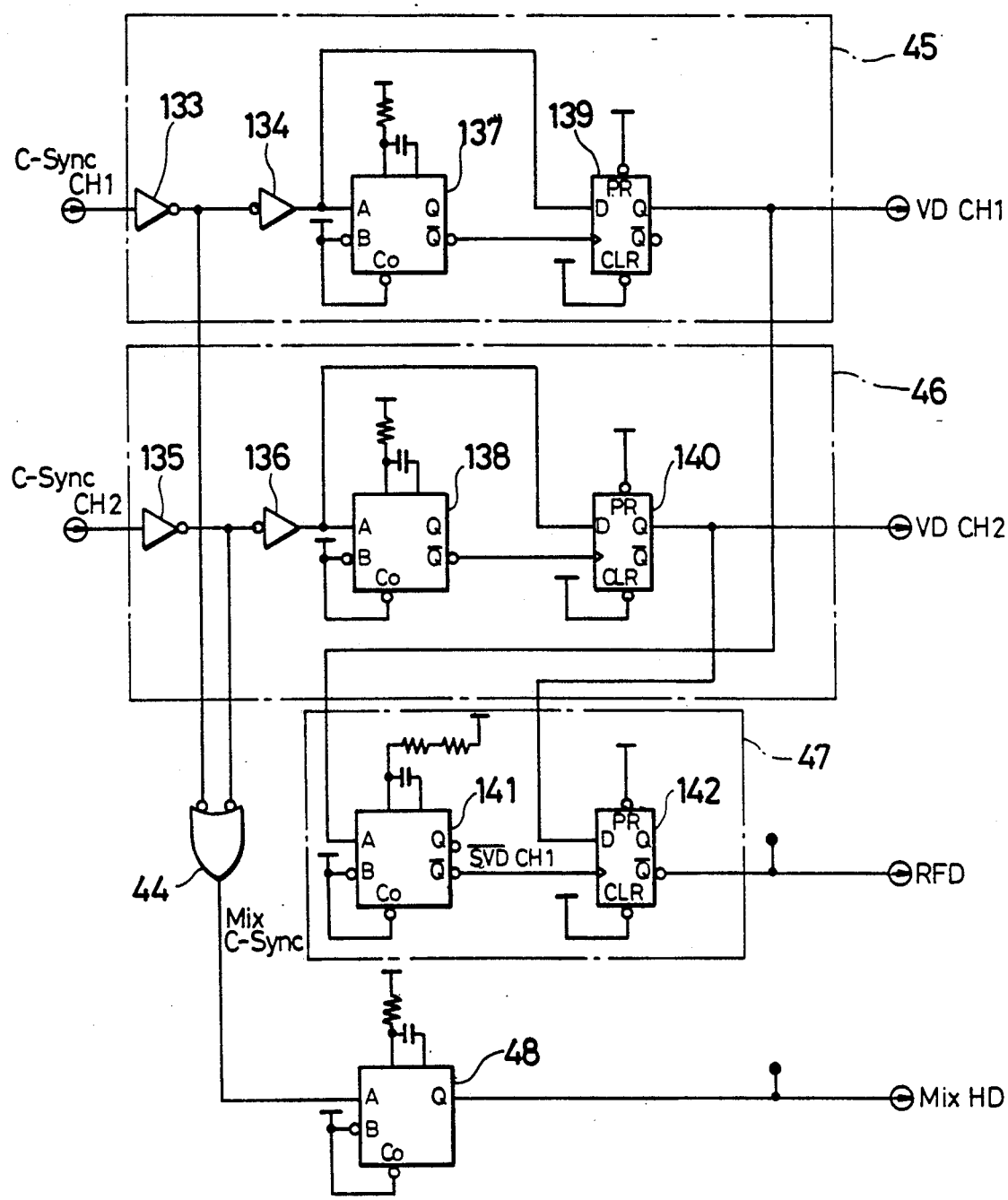

As shown in FIG. 17, the VD generation circuit 45(46) of the line memory control circuit 23 comprises two stages of NOT circuits 133, 134(135, 136), a monostable multivibrator 137(138) whose A terminal is connected to an output terminal of the NOT circuit 134(136) at the second stage and an FF circuit 139(140) whose clock terminal is connected a Q-terminal of the monostable multivibrator 137(138) and whose D-terminal is connected to an output terminal of the NOT circuit 134(136). With the arrangement, the FF circuits 139, 140 can release VD signals (FIGS. 16c,g) of the CH1 and CH2 from the Q-terminals thereof.

The VD signals (FIGS. 16 c, g) are inputted to the field discrimination circuit 47, which includes a monostable multivibrator 141 and an FF circuit 142. The monostable multivibrator 141, whereto the VD signal (FIG. 16c) of the CHI is inputted through an A terminal thereof, is connected to a clock terminal of the FF circuit 142 through a Q̄-terminal thereof. Thus, the monostable multivibrator 141 is arranged to release an inverted SVD signal (FIG. 16 d) of the CHI to the FF circuit 142 from the Q̄-terminal.

The FF circuit 142 to which the SVD signal (FIG. 16d) is inputted has a D-terminal to which the VD signal (FIG. 16g) of the CH2 is inputted, and based on the VD signal (FIG. 16g) and the SVD signal (FIG. 16d), releases the RFD signal (FIG. 16h).

Furthermore, the NOT circuits 133, 135 respectively situated at the first stage of the VD generation circuits 45, 46, have their output terminals respectively connected to input terminals of the 2-input OR circuit 44. The OR circuit 44 is thus arranged to release a Mix C-Sync signal (FIG. 16 i) obtained by conducting logical OR of the composite synchronizing signals (FIGS. 16a,e) of the CHI and CH2. An output terminal of the OR circuit 44 is connected to an A terminal of the monostable multivibrator 48, which releases a MixHD signal (FIG. 16j) with a predetermined pulse width according to the Mix C-Sync signal (FIG. 16i) entered thereto.

The MixHD signal (FIG. 16j) and the RFD signal (FIG. 16h) from the field discrimination circuit 47 are released to the line memory control section 49, as is shown in FIG. 15, and to the line memory control section 49 is connected the PLL circuit 50 for releasing the 4fsc signal and 2fsc signal thereto. As shown in FIG. 19, the line memory control section 49 includes a NOT circuit 143 to which the MixHD signal (FIG. 18 b) is inputted and FF circuits 145, 146, and the NOT circuit 143 is connected to a clock terminal of a counter circuit 147 of HC4040 or the like.

The counter circuit 147 has its RES terminal connected to an output terminal of the NOT circuit 144, with its $Q_1$, $Q_2$, $Q_4$ and $Q_{10}$ terminals connected to respective 4 inputs of a NAND circuit 148. The NAND circuit 148 is connected to a D-terminal of the FF circuit 145. The MixHD signal (FIG. 18b) is inputted to a clock terminal of the FF circuit 145. Thus, the FF circuit 145 is permitted to release an RMSK signal (FIG. 18e) from a Q̄-terminal thereof based on the signal from the NAND circuit 148 and the MixHD signal (FIG. 18b).

The FF circuit 145 has its Q̄-terminal connected to one input terminal of a 2-input NOR circuit 149. To the other input terminal of the NOR circuit 149 is connected a Q-terminal of the FF circuit 146 for releasing the RSEL signal (FIG. 18g) thereto. Thus, the NOR circuit 149 is permitted to release on the one hand, an OE1 signal (FIG. 18 l) based on the RSEL signal (FIG. 18g) and the RMSK signal (FIG. 18e), and on the other hand, an OE2 signal (FIG. 18k) through an NOR circuit 150.

In the meantime, the RFD signal (FIG. 18a) from the field discrimination circuit 47 is fed to a D-terminal of the FF circuit 153 The 2fsc signal (FIG. 18o) from the PLL circuit 50 is fed to a clock terminal of the FF circuit 153. The FF circuit 153 has its Q-terminal connected to a D-terminal of an FF circuit 154, while its Q̄-terminal is connected to one input terminal of a 2-input NAND circuit 152 which is connected to the NOT circuit 144. On the other hand, a Q-terminal of the FF circuit 154 is connected to the other input terminal of the NAND circuit 152.

As in the case of the FF circuit 153, the 2fsc signal (FIG. 18o) is inputted to a clock terminal of the FF circuit 154. The 2fsc signal (FIG. 18o) is also inputted to clock terminals of respective FF circuits 156, 157. Those FF circuits 156, 157 are connected to each other through a Q-terminal of the FF circuit 156 and a D-terminal of the FF circuit 157, and the NOT circuit 143 is connected to a D-terminal of the FF circuit 156, thereby permitting an inverted MixHD signal (FIG. 18c) to be inputted thereto. Further, a Q̄-terminal of the FF circuit 145 is connected to a CLR terminal of the FF circuit 156, and the RMSK signal (FIG. 18e) from the Q-terminal is thus inputted thereto. Moreover, a Q-terminal of the FF circuit 156 is connected not only to the D-terminal of the FF circuit 157, but to one input terminal of the 2-input NAND circuit 151, and to the other input terminal of the NAND circuit 151, is connected a Q-terminal of the FF circuit 157. Thus, the FF circuit 157, which is connected to a CLR terminal of the FF circuit 146 through the NAND circuit 151, is permitted to release an inverted $\overline{\text{VRes}}$ signal (FIG. 18f) to the CLR terminal thereof.

Figure 18:
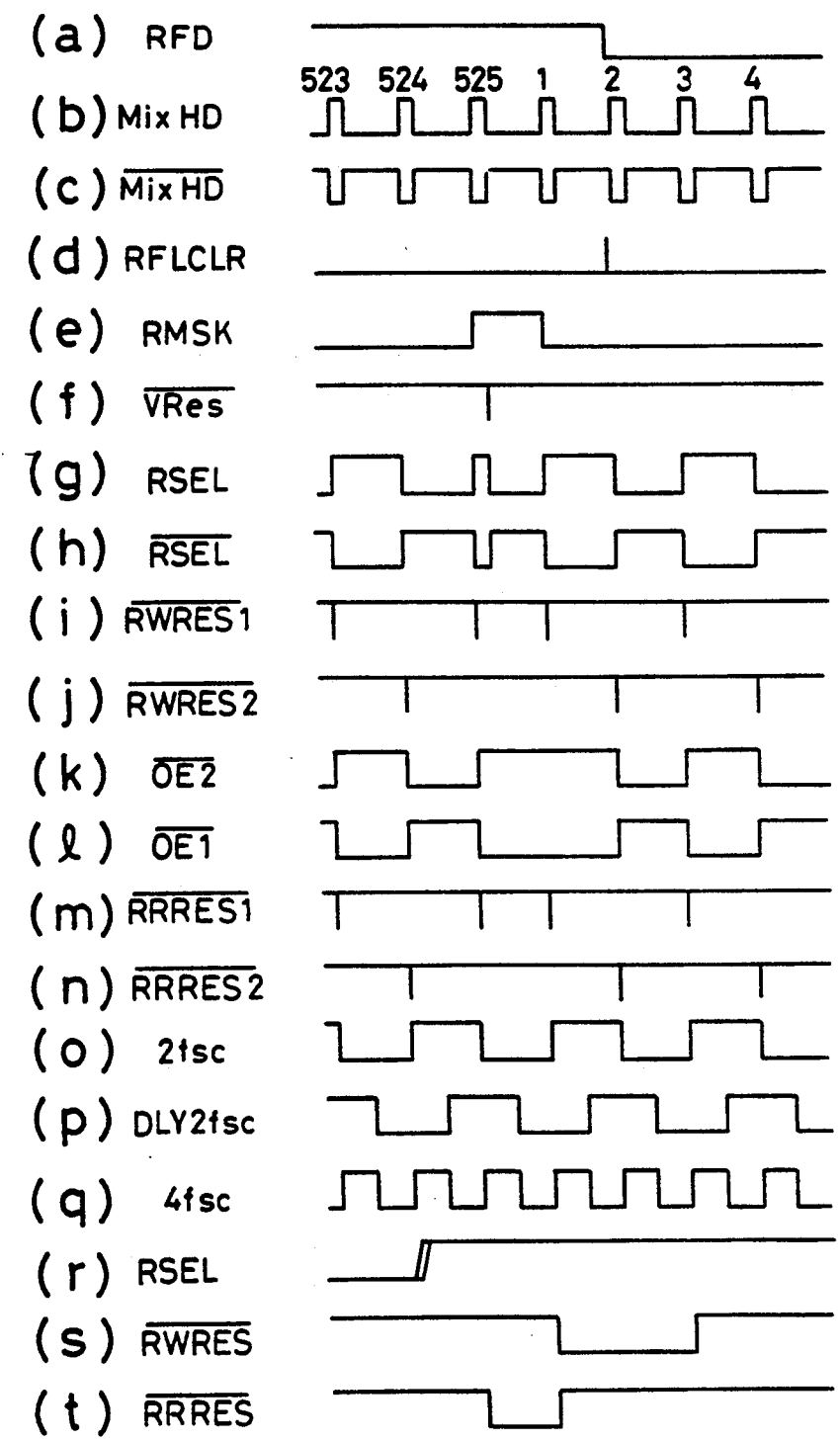
Figure 19:
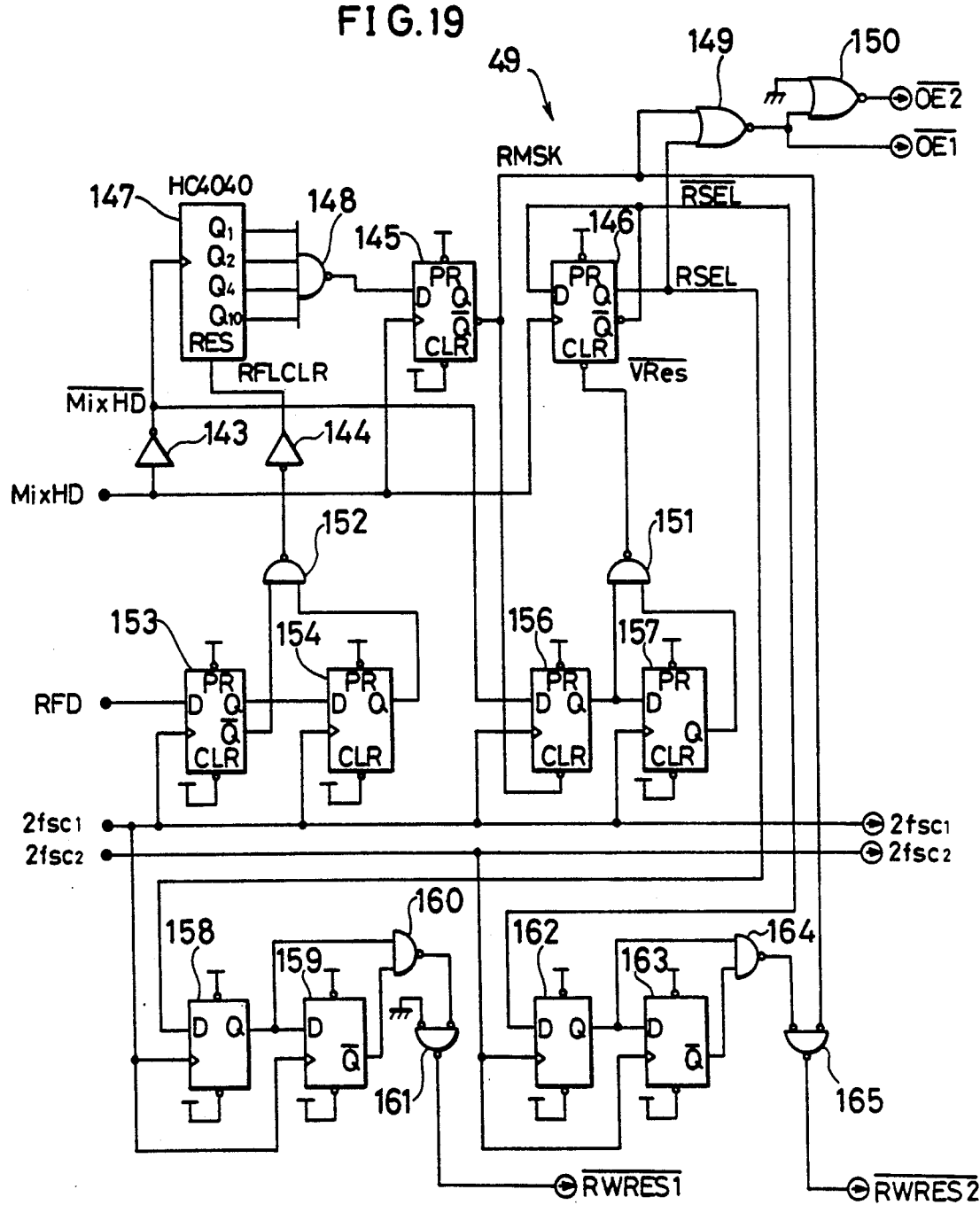

On the other hand, the 2fsc signal (FIG. 18o) which is inputted to the FF circuits 153, 154, 156, 157, is also inputted to FF circuits 158, 159 for generating an $\overline{\text{RWRES1}}$ signal (FIG. 18i) and to FF circuits 162, 163 for generating an $\overline{\text{RWRES2}}$ signal (FIG. 18j). The FF circuits 158, 159 are connected to each other through a Q-terminal of the FF circuit 158 and a D-terminal of the FF circuit 159, and to a D-terminal of the FF circuit 158, is connected a Q-terminal of the FF circuit 146, thereby permitting the RSEL signal (FIG. 18 g) to be inputted thereto.

Further, the Q-terminal and D-terminal of the FF circuits 158, 159 which are connected to each other, are also connected to one input terminals of a 2-input NAND circuit 160. A $\overline{\text{Q}}$-terminal of the FF circuit 159 is connected to the other input terminal of the NAND circuit 160, which is thus arranged to release an inverted $\overline{\text{RWRES}}$ signal. (FIG. 18 i) through an OR circuit 161 of LS32 or the like with one of its input terminals connected to ground.

On the other hand, FF circuits 162, 163, whereto the 2fsc signal (FIG. 18o) is inputted as in the case of the FF circuits 153, 154, are connected to each other through a Q-terminal of the FF circuit 162 and a D-terminal of the FF circuit 163, and a D-terminal of the FF circuit 146 is connected to a D-terminal of the FF circuit 162, thereby permitting the inverted $\overline{\text{RSEL}}$ signal (FIG. 18h) to be entered thereto. Further, the Q-terminal and D-terminal of the FF circuit 162, 163 which are connected to each other, are also connected to one input terminal of a 2-input NAND circuit 164. A $\overline{\text{Q}}$-terminal of the FF circuit 163 is connected to the other input terminal of the NAND circuit 164, and an output of the NAND circuit 164 is connected to one input of an OR circuit 165 of LS32 or the like. A $\overline{\text{Q}}$-terminal of the FF circuit 145 is connected to the other input of the OR circuit 165. The OR circuit 165 thus releases an $\overline{\text{RWRES2}}$ signal (FIG. 18j) through the output thereof.

Figure 20:
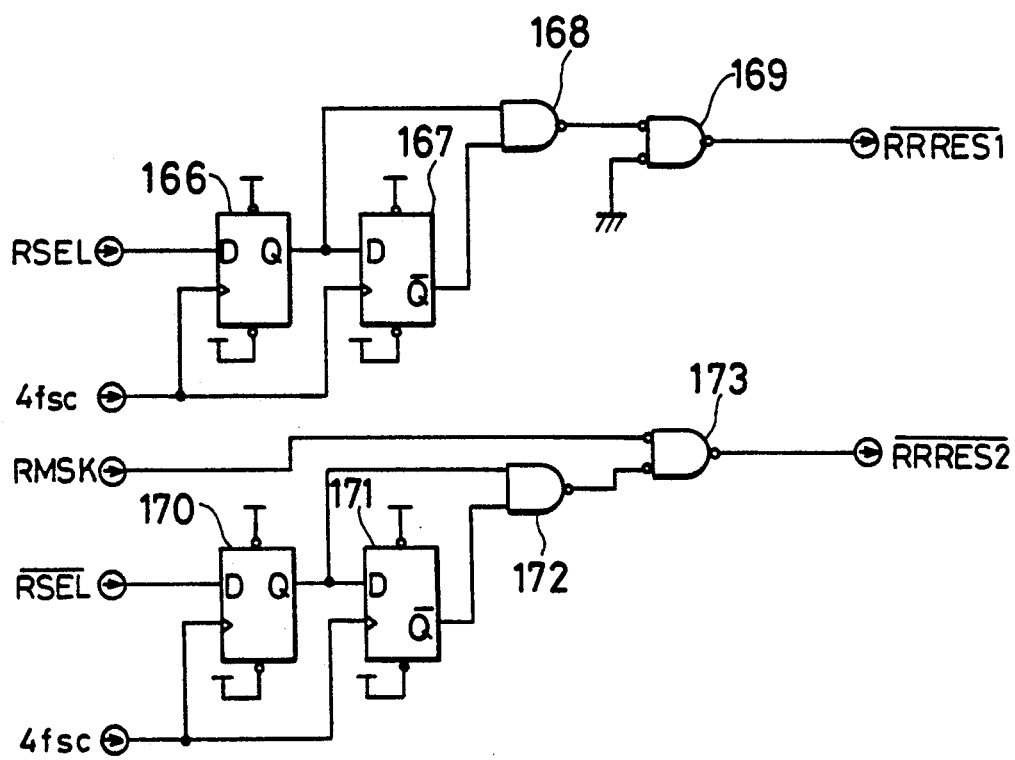

The RSEL signal (FIG. 18g) which is inputted to the FF circuit 158 is also inputted to a D-terminal of the FF circuit 166 as is shown in FIG. 20, and the 4fsc signal (FIG. 18q) from the PLL circuit 50 of FIG. 15 is inputted to a Clock terminal of the FF circuit 166. Moreover, a Q-terminal of the FF circuit 166 is on the one hand connected to a D-terminal of an FF circuit 167 whereto the 4fsc signal (FIG. 18q) is inputted through a clock terminal thereof, and on the other hand connected to one input terminal of a 2-input NAND circuit 168. A $\overline{\text{Q}}$-terminal of the FF circuit 167 is connected to the other input terminal of the NAND circuit 168. The NAND circuit 168 is thus arranged to release an inverted $\overline{\text{RRRES1}}$ signal (FIG. 18m) through an OR circuit 169 of LS32 Or the like.

On the other hand, the $\overline{\text{RSEL}}$ signal (FIG. 18h) which is inputted to the FF circuit 162, is also inputted to a D-terminal of an FF circuit 170. To a clock terminal of FF circuit 170 is inputted the 4fsc signal (FIG. 18q) from the PLL circuit 50 of FIG. 15. Moreover, a Q-terminal of the FF circuit 170 is on the one hand connected to a D-terminal of an FF circuit 171 whereto the 4fsc signal (FIG. 18 q) is entered through a clock terminal thereof, and on the other hand connected to one input terminals of a 2-input NAND circuit 172. A $\overline{\text{Q}}$-terminal of the FF circuit 171 is connected to the other input terminals of the NAND circuit 172.

An output of the NAND circuit 172 is connected to one input terminal of an OR circuit 173 of LS32 or the like. The RMSK signal (FIG. 18e) from the FF circuit 145 of FIG. 19 is inputted to the other input terminal of the OR circuit 173. The OR circuit 173 is thus arranged to release an inverted $\overline{\text{RRRES2}}$ signal (FIG. 18n).

Next, a detailed explanation will be given of the line memories 20, 21 of FIG. 2 which are controlled by the above-mentioned line memory control circuit 23 and of the D/A converter 25 and the A/D converters 18, 19 which are connected to the line memories 20, 21.

Figure 21:
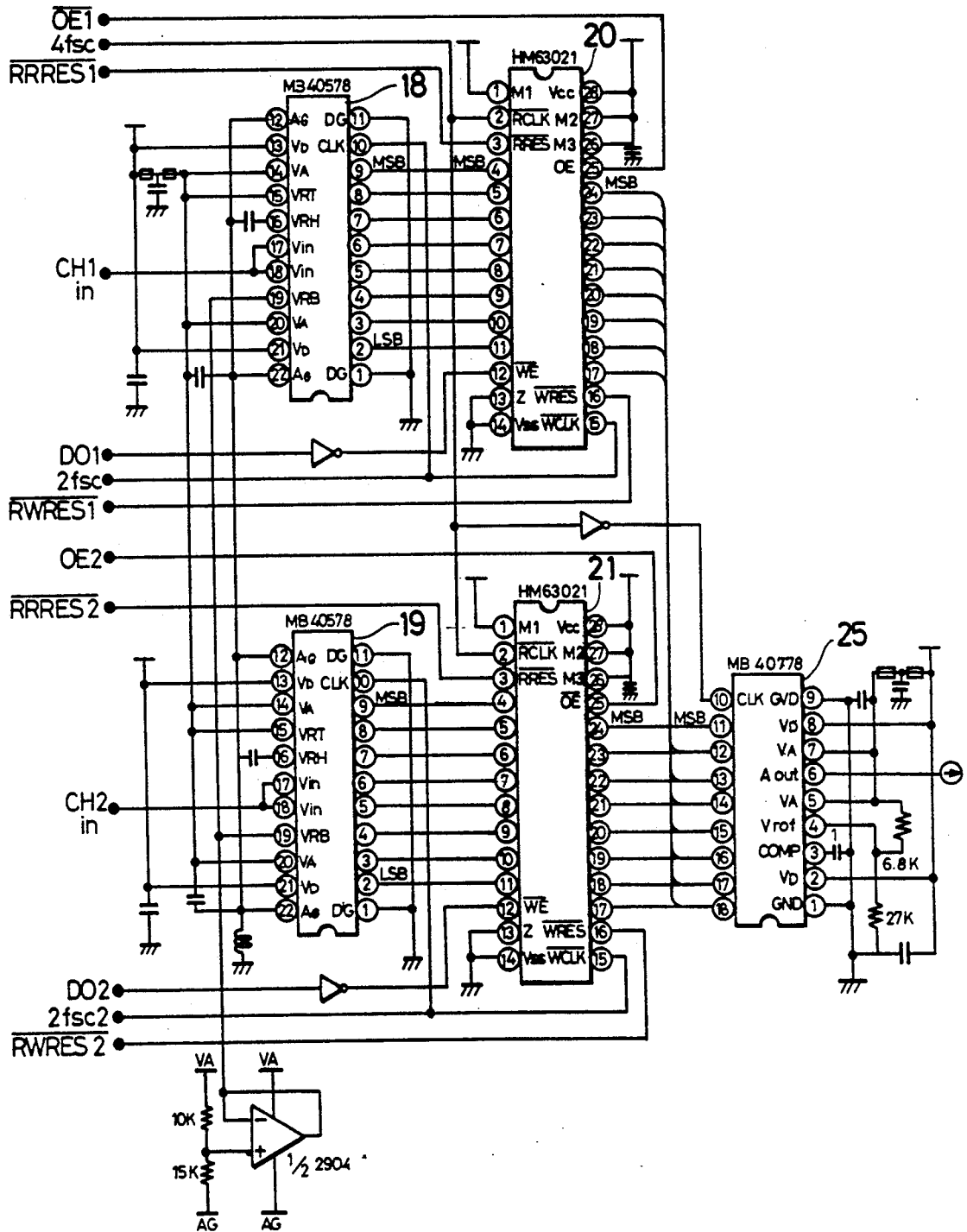

As shown in FIG. 21, for example, HM 63021s are used for line memories 20, 21, and the $\overline{\text{OE1}}$ signal, 4fsc signal, $\overline{\text{RRRES1}}$ signal and other signals from the line memory control circuit 23 are inputted to one of the line memories, 20. Further, the $\overline{\text{OE2}}$ signal, 4fsc signal, $\overline{\text{RRRES2}}$ signal and other signals from the line memory control circuit 23 are inputted to the other line memory 21.

To the line memory 20, is connected the A/D converter 18 of MB40578 or the like for converting the video signal of the CHI from analog signal to digital signal, while to the line memory 21, is connected the A/D converter 19 of MB40578 or the like for converting the video signal of the CH2 from analog signal to digital signal. Outputs of those line memories 20, 21 are connected to the D/A converter 25 of MB40778 or the like, and thereby the D/A converter 25 is arranged to convert the digital signals from the line memories 20, 21 into analog signals so as to form and release an output video signal.

Figure 22:
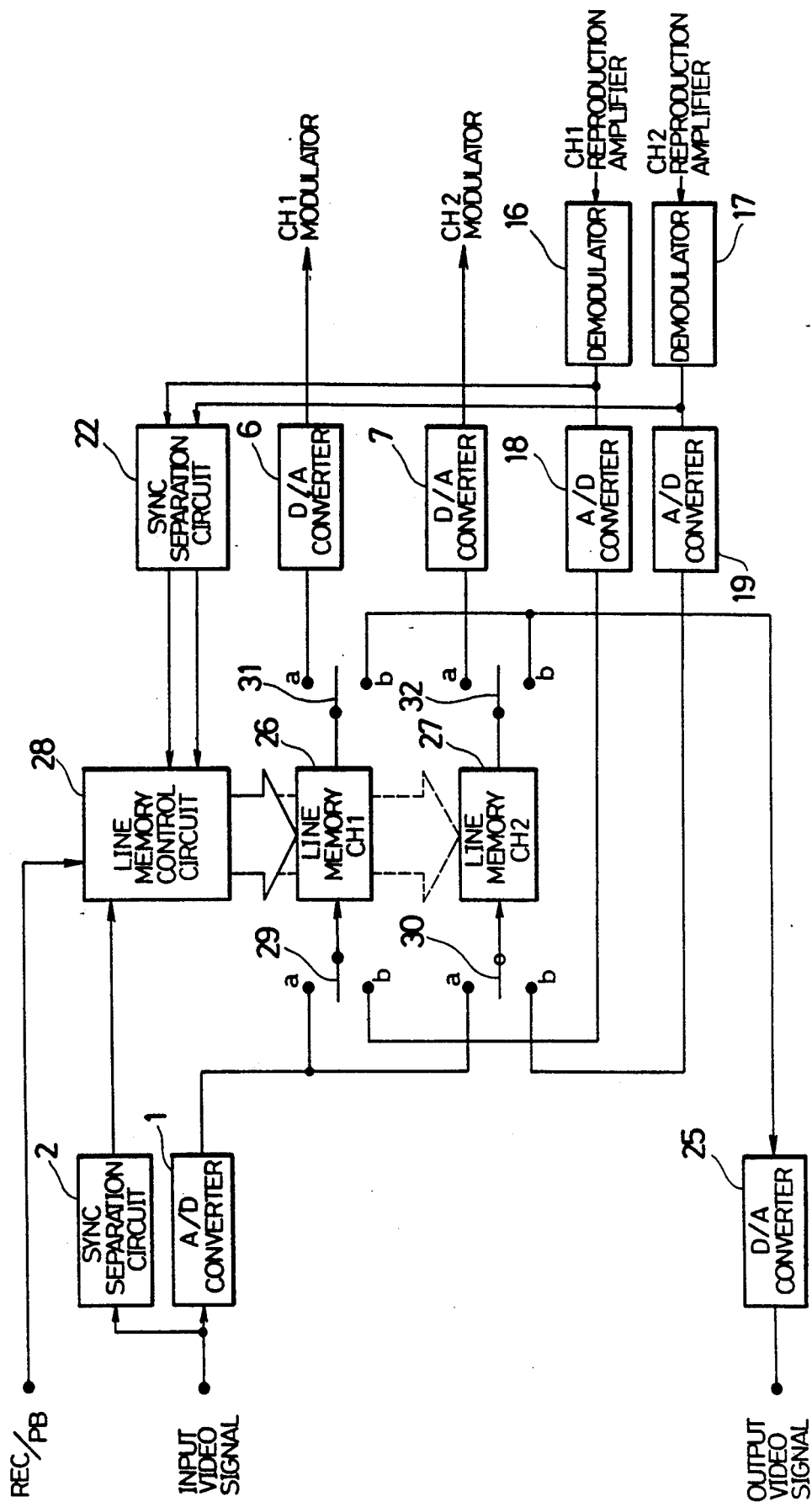
Figure 23:
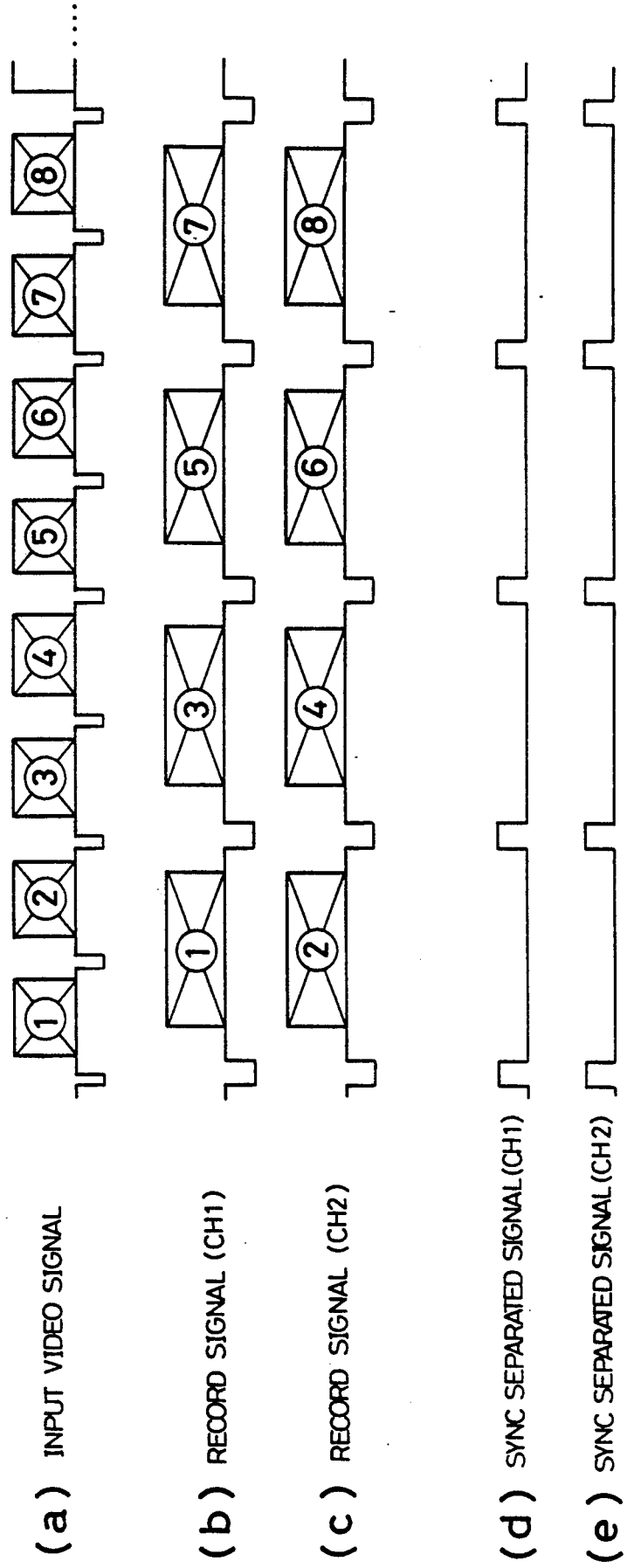
FIG. 23 shows the prior art, and is a timing chart showing conditions of signals in a video signal recording-reproduction device.

Additionally, as shown in FIG. 2, the video signal recording-reproduction device of the present embodiment is provided with line memories 4, 5, 20, 21 and line memory control circuits 3, 23 separately disposed at the respective recording system and reproduction system; yet the device of the present invention is not limited to the arrangement, and, as shown in FIG. 22, may comprise the line memories 26, 27 for CHI and CH2 for use in both the recording system and the reproduction system as well as the line memory control circuit 28 for controlling the line memories 26, 27 in recording as well as in reproduction.

In this case, upon receiving an REC/PB signal for switching between recording and reproduction, the line memory control circuit 28 controls switches 29, 30, 31, 32 (switching means) connected to the input and output terminals of the line memories 26, 27.

More specifically, in the case of recording, the switches 29 to 32 are switched to the side a, and the signal from the A/D converter 1 is inputted to the line memories 26, 27, and is released to the D/A converters 6, 7 after having been subject to time base extension by control of the line memory control circuit 28. On the other hand, in reproduction, the switches 29 to 32 are switched to the side and the signals from the A/D converters 18, 19 are inputted to the respective line memories 26, 27, and are released to the D/A converter 25 after having been subject to time base compression by control of the line memory control circuit 28.

As described above, a video signal recording-reproduction device in accordance with the present invention is provided with a recording system comprising phase changing means for shifting a phase of the record signal of each channel by a 1/N horizontal scanning period, and also provided with a recording system comprising phase restoration means for conducting logical OR of the separated sync signals of the recording signal, each reproduced from each channel.

With the arrangement, the recording signal of each channel is recorded on the recording medium with a phase shift of a 1/N horizontal scanning period, and in reproduction, separated sync signals obtained from respective signals reproduced with the above state are subject to logical OR by the phase restoration means. As a result, a separated sync signal obtained by conducting the logical OR coincides with the horizontal synchronizing signal of the input video signal. Thus, the video signal recording-reproduction, device permits conformity between a separated sync signal derived from recording signals and a horizontal synchronizing signal of an input video signal, which is needed for converting divided record signals into an output video signal, solely by using the phase restoration means for conducting logical OR and thereby a simplified circuit configuration can be achieved.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A video signal recording-reproduction device comprising:
    recording system means for recording an input video signal onto a recording medium;
    said recording system means subjecting the input video signal to time base extension of N-times to form a recording signal;
    said recording system means dividing the recording signal into N or integral multiples of N channels before recording onto the recording medium;
    said recording system means recording a separate sync signal for each channel;
    said recording system means including phase changing means for shifting a phase of the recording signal such that the phase shift between adjacent channels is a 1/N horizontal scanning period; and
    reproduction system means for reproducing each channel of the signals record on the recording medium to form an output video signal by combining the signal from each channel to produce the output video signal;
    said reproduction system means conforming phases of separated sync signals of respective recording signals to a phase of a horizontal synchronizing signal of the input video signal;
    said reproduction system means conducting a logical OR operation upon the separated sync signals of the recording signals for each reproduced channel to restore the phase shifted sync signals so that the sync signals can be properly utilized in the forming of the output video signal.

2. A video signal recording-reproduction device comprising:
    first sync separating means for separating a sync signal, which is to be used as a reference signal for time base extension, from an inputted video signal;
    first A/D converting means for converting the inputted video signal into a digital signal;
    phase changing means for releasing a control signal based on said sync signal, said control signal initiating time base extension by separating said digital signal into two channels and initiating a phase shift to be between the two channel signals;
    signal recording means for performing double time base extension by separating the digital signal into first and second channels, for releasing a recording signal in which a phase of the second channel is shifted by a half horizontal scanning period with respect to the phase of the first channel, the time base extension and the release of the recording signal being based on said control signal from the phase changing means, and for recording the recording signal on a recording medium;
    said phase changing means including,
    a first line memory control circuit for controlling the separation of the digital signal into channels,
    said first line memory control circuit releasing a reset pulse to said recording means based on a clock signal and a horizontal synchronizing signal from said first sync separating means, a cycle of said horizontal synchronizing signal being one horizontal scanning period;
    a reproduction system for reproducing the recording signal from the recording medium;
    a second sync separating means for extracting a separated sync signal from each recording signal reproduced from the two channels, as a reference signal for time base compression;
    a second line memory control circuit including phase restoration means for conducting a logical OR operation upon the separated sync signals generated from each channel, which generates a horizontal synchronizing signal with a frequency identical to the input video signal based on the logical OR operation and releases a signal for time base compression according to the reference signal; and
    a video signal production system for conducting time base compression of recording signals reproduced from the two channels according to the signal for time base compression released from the second line memory control circuit.

3. The video signal recording-reproduction device as set forth in claim 2, wherein said signal recording means comprises:
    first and second line memories for dividing the digital signal from said first A/D converter into two channels, for applying time base extension to each channel, and for shifting a phase of a signal so to have a phase shift of a ½ horizontal scanning period with respect to each adjacent channel, according to an output of said first line memory control circuit;
    first and second D/A converters for converting respective output signals of said first and second line memories into analog signals;
    first and second modulators for frequency modulating respective outputs of said first and second D/A converters; and
    first and second recording amplifiers for releasing recording signals corresponding to respective signals of the channels by amplifying the outputs of said first and second modulators.

4. The video signal recording-reproduction device as set forth in claim 2, wherein said video signal production system comprises:

first and second reproduction amplifiers for amplifying the respective recording signals reproduced from the two channels;

first and second demodulators for demodulating respective outputs of said first and second reproduction amplifiers;

second and third A/D converters for converting respective output signals from said first and second demodulators into digital signals;

third and fourth line memories for conducting time base compression of respective output signals from said second and third A/D converters according to the signal for time base compression from said second line memory control circuit;

switching means for selecting an output of said third line memory upon receiving every odd numbered horizontal scanning period and for selecting an output of said fourth line memory upon receiving every even numbered horizontal scanning period; and a third D/A converter for forming an output video signal by converting an output of the switching mans into an analog signal.

5. The video signal recording-reproduction device as set forth in claim 2, wherein said second line memory control circuit further comprises:

a monostable multivibrator for generating a constant pulse width composite synchronizing signal subject to a logical OR operation by said phase restoration means;

a PLL circuit for generating a reference clock signal and a clock signal having a frequency of ½ of that of the reference clock signal;

first and second vertical synchronizing signal generation circuits for generating vertical synchronizing signals for use in the respective channels;

a field discrimination circuit; and a line memory control section for releasing various control signals according to each output of said monostable multivibrator, said field discrimination circuit, and said PLL circuit.

6. The video signal recording-reproduction device as set forth in claim 5, wherein said first or second vertical synchronizing signal generation circuit which releases a vertical synchronizing signal to each channel.

7. The video signal recording-reproduction device as set forth in claim 6, wherein said field discrimination circuit comprises:

a monostable multivibrator having a trigger input terminal and an inverter output terminal; and a flip-flow having a data input terminal and a clock signal input terminal;

said trigger input terminal having an output of said first vertical synchronizing signal generation circuit inputted thereto;

said data input terminal having an output of the second vertical synchronizing signal generation circuit inputted thereto;

said inverted output terminal being connected to the clock terminal thereof.

8. A video signal recording-reproduction device comprising:

first sync separating means for separating a sync signal, which is to be used as a reference signal for time base extension, from an inputted video signal;

first A/D converting means for converting the inputted video signal into a digital signal;

phase changing means for releasing a control signal based on said sync signal, said control signal initiating time base extension by separating said digital signal into two channels and initiating a phase shift to be between the two channel signals;

signal recording means for performing double time base extension by separating the digital signal into first and second channels, for releasing a recording signal in which a phase of the second channel is shifted by a half horizontal scanning period with respect to the phase of the first channel, the time base extension and the release of the recording signal being based on said control signal from the phase changing means, and for recording the recording signal on a recording medium;

said phase changing means including, a first line memory control circuit for controlling the separation of the digital signal into channels; said first line memory control circuit releasing a reset pulse, to said recording means based on a clock signal and a horizontal synchronizing signal from aid first sync separating means, a cycle of said horizontal synchronizing signal being one horizontal scanning period; said first line memory control circuit further including, a horizontal synchronizing signal generation circuit for generating a horizontal synchronizing signal according to a composite synchronizing signal inputted from sync separation circuit, a field discrimination circuit for conducting vertical sync separation and discriminating whether a field in question is odd numbered field or an even numbered field, a frame clear pulse generating circuit for generating two signals, each having a different phase and being released once every frame, according to an output of said field discrimination circuit, a selector pulse generation circuit for generating a signal for selecting an odd numbered horizontal scanning period, according to an output of aid frame clear pulse generation circuit, a PLL circuit for generating a reference clock signal, and first and second line memory control sections for, respectively, releasing a signal indicating a start point for writing, a signal indicating a start point for reading, and a clock signal for reading out.

9. The video signal recording-reproduction device as set forth in claim 8, wherein said field discrimination circuit releases a vertical synchronizing signal as well as a frame detection signal which are set low at every odd numbered field and set high at every even numbered field, according to the composite synchronizing signal and the horizontal synchronizing signal inputted thereto.

10. The video signal recording-reproduction device as set forth in claim 9, wherein said frame clear pulse generation circuit comprises:

a first circuit for releasing a first clear signal having a pulse width corresponding to one cycle of the reference clock signal in response to a falling edge of the frame detection signal during a horizontal scanning period representing a leading portion of a frame, according to the frame detection signal from said field discrimination circuit and the reference clock from said PLL circuit;

a second circuit for releasing a second clear signal with phase lead of substantially one horizontal scanning period to the first clear signal, beginning at a horizontal scanning period representing an ending portion of a frame, according to the frame detecting signal of aid field discrimination circuit and reference clock signal of said PLL circuit; and a third circuit for releasing two signals for resetting the signal indicating a start point for writing according to the horizontal synchronizing signal.

11. The video signal recording-reproduction device as set forth in claim 10, wherein said selector pulse generation circuit comprises:

a first flip-flop which includes a clear terminal to which said first clear signal is inputted and a clock terminal to which the horizontal synchronizing signal is inputted, thereby releasing a signal for selecting an odd numbered horizontal scanning period upon receiving said second clear signal.

12. The video signal recording and reproducing device as set forth in claim 11, wherein said first or second line memory control section comprises:

a plurality of inverter circuits and an asynchronous clear-type dividing circuit;

said plurality of inverter circuits releasing a clock signal for writing having a slight phase delay to the reference clock signal;

said dividing circuit releasing a clock signal for reading out having a frequency equivalent to ½ of that of the reference clock signal, whereby data are subject to double time base extension.

13. The video signal recording-reproduction device of claim 8, wherein said signal recording means includes, first and second line memories for dividing the digital signal from said first A/D converter into two channels, for applying time base extension to each channel, and for shifting a phase of a signal so to have a phase shift of a ½ horizontal scanning period with respect to each adjacent channel, according to an output of said first line memory control circuit;

first and second D/A converts for converting respective output signals of said first and second line memories into analog signals;

first and second modulators for frequency modulating respective outputs of said first and second D/A converters; and first and second recording amplifiers for releasing recording signals corresponding to respective signals of the channels by amplifying the outputs of said first and second modulators.

* * * * *